(12) United States Patent
Wang et al.

(10) Patent No.: US 12,168,227 B2
(45) Date of Patent: Dec. 17, 2024

(54) ACTUATION SYSTEMS AND METHODS FOR USE WITH FLOW CELLS

(71) Applicant: Illumina Singapore PTE. Ltd., Singapore (SG)

(72) Inventors: Shyun Long Wang, Singapore (SG); Beng Keong Ang, Singapore (SG)

(73) Assignee: Illumina Singapore PTE. LTD., Singapore (SG)

( * ) Notice: Subject to any disclaimer, the term of this patent is extended or adjusted under 35 U.S.C. 154(b) by 359 days.

(21) Appl. No.: 17/115,430

(22) Filed: Dec. 8, 2020

(65) Prior Publication Data

US 2021/0170406 A1 Jun. 10, 2021

Related U.S. Application Data

(60) Provisional application No. 62/946,361, filed on Dec. 10, 2019.

(51) Int. Cl.
*B01L 3/00* (2006.01)
*B01L 9/00* (2006.01)
(Continued)

(52) U.S. Cl.
CPC ......... *B01L 3/502715* (2013.01); *B01L 9/527* (2013.01); *G01N 35/04* (2013.01); *G01N 35/1095* (2013.01); *B01L 2200/025* (2013.01); *B01L 2200/026* (2013.01); *B01L 2200/0689* (2013.01); *B01L 2200/143* (2013.01); (Continued)

(58) Field of Classification Search
CPC ............... B01L 3/502715; B01L 9/527; B01L 2200/025; B01L 2200/026; B01L 2200/0689; B01L 2200/143; B01L 2300/0877; B01L 2300/123; G01N 35/04; (Continued)

(56) References Cited

U.S. PATENT DOCUMENTS 8,641,986 B2 2/2014 Glezer et al.
9,410,977 B2 8/2016 Stone et al.
(Continued)

FOREIGN PATENT DOCUMENTS

CN 207102625 U 3/2018
RU 2658495 C1 6/2018
(Continued)

*Primary Examiner* — Matthew D Krcha
*Assistant Examiner* — Tingchen Shi
(74) *Attorney, Agent, or Firm* — MARSHALL, GERSTEIN & BORUN LLP

(57) ABSTRACT

Actuation systems and methods for use with flow cells. An example apparatus includes a flow cell assembly including a flow cell including at least one channel, a flow cell inlet, and a flow cell outlet. The flow cell assembly includes a gasket assembly operatively fluidically coupled to the flow cell and having a flow cell inlet gasket and a flow cell outlet gasket. The flow cell inlet gasket having a through bore and being fluidically coupled to the flow cell inlet. The flow cell outlet gasket having a through bore and being fluidically coupled to the flow cell outlet. The apparatus includes a reagent cartridge adapted to receive the flow cell assembly and including a pair of reagent cartridge ports adapted to be fluidly coupled to the flow cell inlet gasket and the flow cell outlet gasket.

30 Claims, 23 Drawing Sheets

(51) Int. Cl.
*G01N 35/04* (2006.01)
*G01N 35/10* (2006.01)

(52) U.S. Cl.
CPC . *B01L 2300/0877* (2013.01); *B01L 2300/123* (2013.01); *G01N 2035/0401* (2013.01); *G01N 2035/0475* (2013.01)

(58) Field of Classification Search
CPC ....... G01N 35/1095; G01N 2035/0401; G01N 2035/0475
See application file for complete search history.

(56) References Cited

U.S. PATENT DOCUMENTS

| | | | |
|---|---|---|---|
| 9,777,325 | B2 | 10/2017 | Stone et al. |
| 9,958,465 | B2 | 5/2018 | Ang et al. |
| 2005/0019898 | A1* | 1/2005 | Adey ................... B01J 19/0093 435/293.1 |
| 2006/0019379 | A1* | 1/2006 | Taylor ............... B01L 3/502761 366/115 |
| 2011/0315227 | A1* | 12/2011 | Shu ........................ B01L 9/527 137/1 |
| 2015/0045234 | A1* | 2/2015 | Stone ................... C12Q 1/6874 435/6.1 |
| 2017/0014824 | A1 | 1/2017 | Boyd et al. |
| 2018/0015474 | A1* | 1/2018 | Arlett ................. B01L 3/50273 |
| 2018/0117587 | A1 | 5/2018 | Lemoine et al. |
| 2018/0217170 | A1 | 8/2018 | Ang et al. |
| 2018/0272347 | A1* | 9/2018 | Zenhausern ........ F16K 99/0044 |
| 2019/0351413 | A1 | 11/2019 | Delattre et al. |

FOREIGN PATENT DOCUMENTS

| | | |
|---|---|---|
| WO | WO-99/019717 A1 | 4/1999 |
| WO | WO-2018/187207 A2 | 10/2018 |

\* cited by examiner

ACTUATION SYSTEMS AND METHODS FOR USE WITH FLOW CELLS

CROSS-REFERNECE TO RELATED APPLICATIONS

This application claims priority to U.S. Provisional Application No. 62/946,361, filed Dec. 10, 2019, the content of which is incorporated by reference herein in its entirety and for all purposes.

BACKGROUND

Fluidic cartridges carrying reagents and a flow cell are sometimes used in connection with fluidic systems. The fluidic cartridge may be fluidically coupled to the flow cell. The fluidic cartridges include fluidic lines through which the reagents flow to the flow cell.

SUMMARY

In accordance with a first implementation, a method comprises or includes linearly moving a lift plate and a system plunger assembly carried by the lift plate toward a reagent cartridge plunger assembly of a regent cartridge. The system plunger assembly comprising or including at least one system plunger. The reagent plunger assembly comprising or including at least one reagent cartridge plunger. The method includes actuating the at least one reagent cartridge plunger a first predetermined distance to contact a gasket assembly of a flow cell assembly responsive to the at least one system plunger contacting the at least one reagent cartridge plunger. The flow cell assembly comprising or including a flow cell including at least one channel, a flow cell inlet, and a flow cell outlet. A first fluidic coupling fluidically coupled to the flow cell inlet and a second fluidic coupling fluidically coupled to the flow cell outlet. The gasket assembly is fluidically coupled to the first and second fluidic couplings and comprising or having an inlet gasket comprising or having a through bore and being fluidically coupled to the flow cell inlet via the first fluidic coupling and an outlet gasket comprising or having a through bore and being coupled to the flow cell outlet via the second fluidic coupling. The method comprises or includes fluidically coupling the inlet gasket to a first reagent cartridge port of the reagent cartridge and fluidically coupling the outlet gasket to a second reagent cartridge port of the reagent cartridge responsive to the at least one system plunger actuating the at least one reagent cartridge plunger a second predetermined distance to allow fluid communication between the reagent cartridge ports and the flow cell via the flow cell inlet and the flow cell outlet.

In accordance with a second implementation, an apparatus comprises or includes a system comprising or including a reagent cartridge receptacle and a lift plate assembly comprising or including a lift plate, a system plunger assembly carried by the lift plate and comprising or including a plurality of system plungers, and a lift plate drive assembly operatively coupled to the lift plate. The apparatus comprises or includes a flow cell assembly comprising or including a flow cell comprising or including at least one channel, a flow cell inlet, and a flow cell outlet. The flow cell assembly comprises or includes a fluidic coupling fluidically coupled to each of the flow cell inlet and the flow cell outlet and a gasket assembly fluidically coupled to the fluidic coupling and having a flow cell inlet gasket and a flow cell outlet gasket. The flow cell inlet gasket comprising or having a through bore and being fluidically coupled to the flow cell inlet via the fluidic coupling. The flow cell outlet gasket comprising or having a through bore and being fluidically coupled to the flow cell outlet view the fluidic coupling. The apparatus comprises or includes a reagent cartridge receivable within the reagent cartridge receptacle. The reagent cartridge comprises or includes a reagent cartridge plunger assembly having a plurality of reagent cartridge plungers. Each reagent cartridge plunger is adapted to be aligned with a corresponding system plunger of the system plunger assembly and a corresponding flow cell gasket of the flow cell assembly when the reagent cartridge is received within the reagent cartridge receptacle. The reagent cartridge includes a pair of reagent cartridge ports adapted to be fluidically coupled to the flow cell inlet gasket and the flow cell outlet gasket.

In accordance with a third implementation, an apparatus comprises or includes a flow cell assembly comprising or including a flow cell comprising or including at least one channel, a flow cell inlet, and a flow cell outlet. The flow cell assembly comprises or includes a gasket assembly operatively fluidically coupled to the flow cell and comprising or having a flow cell inlet gasket and a flow cell outlet gasket. The flow cell inlet gasket comprising or having a through bore and being fluidically coupled to the flow cell inlet. The flow cell outlet gasket comprising or having a through bore and being fluidically coupled to the flow cell outlet. The apparatus comprises or includes a reagent cartridge adapted to receive the flow cell assembly and comprising a pair of reagent cartridge ports adapted to be fluidly coupled to the flow cell inlet gasket and the flow cell outlet gasket.

In accordance with a fourth implementation, a method comprises or includes linearly moving a lift plate and a system plunger assembly carried by the lift plate toward a reagent cartridge plunger assembly of a regent cartridge. The system plunger assembly comprises or includes a plurality of system plungers. The reagent plunger assembly comprises or includes a plurality of reagent cartridge plungers. The method comprises or includes engaging the reagent cartridge plungers and the system plungers. The method comprises or includes based on the engagement between the reagent cartridge plungers and the system plungers and the movement of the lift plate and the system plunger assembly, moving the reagent cartridge plungers toward a gasket assembly of a flow cell assembly. The flow cell assembly comprises or includes a flow cell including at least one channel, a flow cell inlet, and a flow cell outlet. A fluidic coupling is coupled to each of the flow cell inlet and the flow cell outlet. The gasket assembly is coupled to the fluidic coupling and comprises or includes a plurality of flow cell gaskets. One of the flow cell gaskets comprises or includes a through bore and is coupled to the flow cell inlet via the fluidic coupling. Another of the flow cell gaskets comprises or includes a through bore and is coupled to the flow cell outlet via the fluidic coupling. The method comprises or includes engaging the reagent cartridge plungers and the flow cell gaskets. The method comprises or includes based on the engagement and the movement of the lift plate and the system plunger assembly, moving the flow cell gaskets having the through bores toward a pair of reagent cartridge ports of the reagent cartridge. The method comprises or includes engaging the flow cell gaskets and the reagent cartridge ports to allow fluid communication between the pair of reagent cartridge ports and the flow cell via the flow cell inlet and the flow cell outlet.

In accordance with a fifth implementation, an apparatus comprises or includes a system, a flow cell assembly, and a reagent cartridge. The system comprises or includes a reagent cartridge receptacle; a lift plate assembly including a lift plate, a system plunger assembly carried by the lift plate and including a plurality of system plungers, and a lift plate drive assembly operatively coupled to the lift plate. The flow cell assembly comprises or includes a flow cell including at least one channel, a flow cell inlet, and a flow cell outlet. The flow cell assembly comprises or includes a fluidic coupling coupled to each of the flow cell inlet and the flow cell outlet. The flow cell assembly comprises or includes a gasket assembly coupled to the fluidic coupling and comprising or including a plurality of flow cell gaskets. One of the flow cell gaskets comprises or includes a through bore and is coupled to the flow cell inlet via the fluidic coupling. Another of the flow cell gaskets comprising or including a through bore and is coupled to the flow cell outlet via the fluidic coupling. The reagent cartridge is receivable within the reagent cartridge receptacle. The reagent cartridge comprises or includes a flow cell receptacle adapted to receive the flow cell assembly. The reagent cartridge comprises or includes a reagent cartridge plunger assembly comprising or including a plurality of reagent cartridge plungers. Each reagent cartridge plunger is positioned to correspond to a corresponding system plunger of the system plunger assembly and a corresponding flow cell gasket of the flow cell assembly when the reagent cartridge is received within the reagent cartridge receptacle and the flow cell is received within the flow cell receptacle. The reagent cartridge comprises or includes a pair of reagent cartridge ports adapted to be fluidly coupled to the flow cell gaskets having the through bores.

In accordance with a sixth implementation, an apparatus comprises or includes a flow cell assembly and a reagent cartridge. The flow cell assembly comprises or includes a flow cell including at least one channel, a flow cell inlet, and a flow cell outlet. The flow cell assembly comprises or includes a fluidic coupling coupled to each of the flow cell inlet and the flow cell outlet. The flow cell assembly comprises or includes a gasket assembly coupled to the fluidic coupling and comprising or including a plurality of flow cell gaskets. One of the flow cell gaskets comprising or including a through bore and being coupled to the flow cell inlet via the fluidic coupling. Another of the flow cell gaskets comprising or including a through bore and being coupled to the flow cell outlet via the fluidic coupling. The reagent cartridge is receivable within the reagent cartridge receptacle. The reagent cartridge comprises or includes a flow cell receptacle adapted to receive the flow cell assembly. The reagent cartridge comprises or includes a reagent cartridge plunger assembly comprising or including a plurality of reagent cartridge plungers. Each reagent cartridge plunger is adapted to be aligned with a corresponding flow cell gasket of the flow cell assembly when the flow cell is received within the flow cell receptacle. The reagent cartridge comprises or includes a pair of reagent cartridge ports adapted to be fluidly coupled to the flow cell gaskets having the through bores.

In further accordance with the foregoing first, second, third, fourth, fifth, and/or sixth implementations, an apparatus and/or method may further comprise or include any one or more of the following:

In an implementation, the first fluidic coupling and the second fluidic coupling of the flow cell assembly are each a flexible fluidic coupling such that the flow cell is moveable at least one of vertically, longitudinally, or laterally relative to the gasket assembly while the inlet gasket is fluidically coupled to the first reagent cartridge port of the reagent cartridge and the outlet gasket is fluidically coupled to the second reagent cartridge port of the reagent cartridge.

In another implementation, the method comprises or includes moving the system plungers in a direction opposite a direction of movement of the lift plate and against a spring force.

In another implementation, the lift plate applies a first compressive force on a reagent cartridge body while the spring force and the system plungers apply a second, different compressive force on the inlet gasket and the outlet gasket.

In another implementation, the first fluidic coupling and the second fluidic coupling are combined.

In another implementation, the fluidic coupling comprises or includes a first fluidic coupling and a second fluidic coupling.

In another implementation, the lift plate drive assembly is adapted to linearly move the lift plate and the system plungers and cause the system plungers to engage and move the reagent cartridge plungers into engagement with the gasket assembly to allow fluid communication between the pair of reagent cartridge ports and the flow cell via the flow cell inlet and the flow cell outlet.

In another implementation, the system plungers comprise or include a pair of system plungers and the reagent cartridge plungers comprise or include a pair of reagent cartridge plungers.

In another implementation, the flow cell assembly further comprises or includes a leveler gasket.

In another implementation, the system plungers comprise or include a leveler system plunger. The reagent cartridge plungers further comprise or include a leveler reagent cartridge plunger, and the reagent cartridge comprises or includes a reagent cartridge engagement surface.

In another implementation, the lift plate drive assembly is adapted to linearly move the lift plate and the leveler system plunger to engage and move the leveler reagent plunger into engagement with the gasket assembly to allow engagement between the leveler gasket and the reagent cartridge engagement surface.

In another implementation, the leveler gasket, the flow cell inlet gasket, and the flow cell outlet gasket are arranged in a triangular pattern.

In another implementation, the flow cell assembly comprises or has a flow cell housing that carries the flow cell, the fluidic coupling, and the gasket assembly.

In another implementation, the flow cell housing comprises or has a dimensional envelope and the gasket assembly is disposed within the dimensional envelope of the flow cell housing.

In another implementation, the flow cell housing comprises or includes an opening that corresponds to each flow cell gasket.

In another implementation, the openings are arranged to allow the flow cell gaskets to protrude from the dimensional envelope of the flow cell housing after the reagent cartridge plungers move the gasket assembly a predetermined distance.

In another implementation, the flow cell gaskets comprise or have flat surfaces and the reagent cartridge comprises or includes a reagent cartridge engagement surface that faces a flow cell receptacle of the reagent cartridge.

In another implementation, the flat surfaces of the flow cell gaskets are arranged to engage the reagent cartridge engagement surface to fluidically couple the pair of reagent cartridge ports with the flow cell.

In another implementation, the reagent cartridge comprises or includes alignment receptacles that face a flow cell receptacle of the reagent cartridge and the gasket assembly comprises or has alignment protrusions that are adapted to be received by the alignment receptacles.

In another implementation, the gasket assembly comprises or has a plurality of engagement protrusions that comprise or include corresponding plunger receptacles. Each plunger receptacle is adapted to be engaged or surrounded by a distal end of a corresponding reagent cartridge plunger.

In another implementation, the lift plate comprises or includes plunger bores and each system plunger is slidably disposed within a corresponding plunger bore.

In another implementation, a spring is disposed in each of the plunger bores.

In another implementation, the springs act on the system plungers to urge a distal end of the system plungers into engagement with a corresponding reagent cartridge plunger.

In another implementation, the apparatus comprises or includes a seal carried by the system plunger.

In another implementation, the reagent cartridge comprises or includes a flow cell receptacle adapted to receive the flow cell assembly.

In another implementation, a flexible fluidic coupling couples the flow cell inlet and the flow cell inlet gasket and couples the flow cell outlet and the flow cell outlet gasket.

In another implementation, a reagent cartridge plunger assembly comprises or has a plurality of reagent cartridge plungers. Each reagent cartridge plunger is adapted to be aligned with a corresponding flow cell gasket of the flow cell assembly.

In another implementation, the flow cell assembly further comprises or includes a leveler gasket and the reagent cartridge comprises or includes a reagent cartridge engagement surface adapted to be engaged by the leveler gasket.

In another implementation, the flow cell inlet gasket, the flow cell outlet gasket, and the leveler gasket are arranged in a triangular pattern.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Although the following text discloses a detailed description of implementations of methods, apparatuses, and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative examples would still fall within the scope of the claims.

The implementations disclosed herein are directed toward flow cell cartridges having fluidic couplings. The fluidic couplings are movable into fluidic communication with corresponding reagent cartridge ports of a reagent cartridge via a lift plate assembly of a system (a sequencing system). In one implementation, the lift plate assembly includes a lift plate that carries a system plunger assembly including at least one system plunger. The reagent cartridge includes a reagent cartridge plunger assembly including at least one reagent cartridge plunger. The reagent cartridge plunger is adapted to be aligned with a corresponding system plunger and a corresponding flow cell gasket of a flow cell assembly.

When the lift plate of the system is linearly moved toward the reagent cartridge, via a drive assembly, the system plungers engage and move the reagent cartridge plungers and allow the reagent cartridge plunger to move the gasket assembly including the flow cell gaskets. The flow cell gaskets are coupled to the flow cell, such as via the flexible fluidic coupling. Moving the flow cell gaskets allows fluid communication between the pair of reagent cartridge ports and the flow cell, such as via the flexible fluidic coupling. Springs may bias the system plungers. The springs may be adapted to prevent the system plungers from compressing the flow cell gaskets over a threshold amount.

Figure 1A:
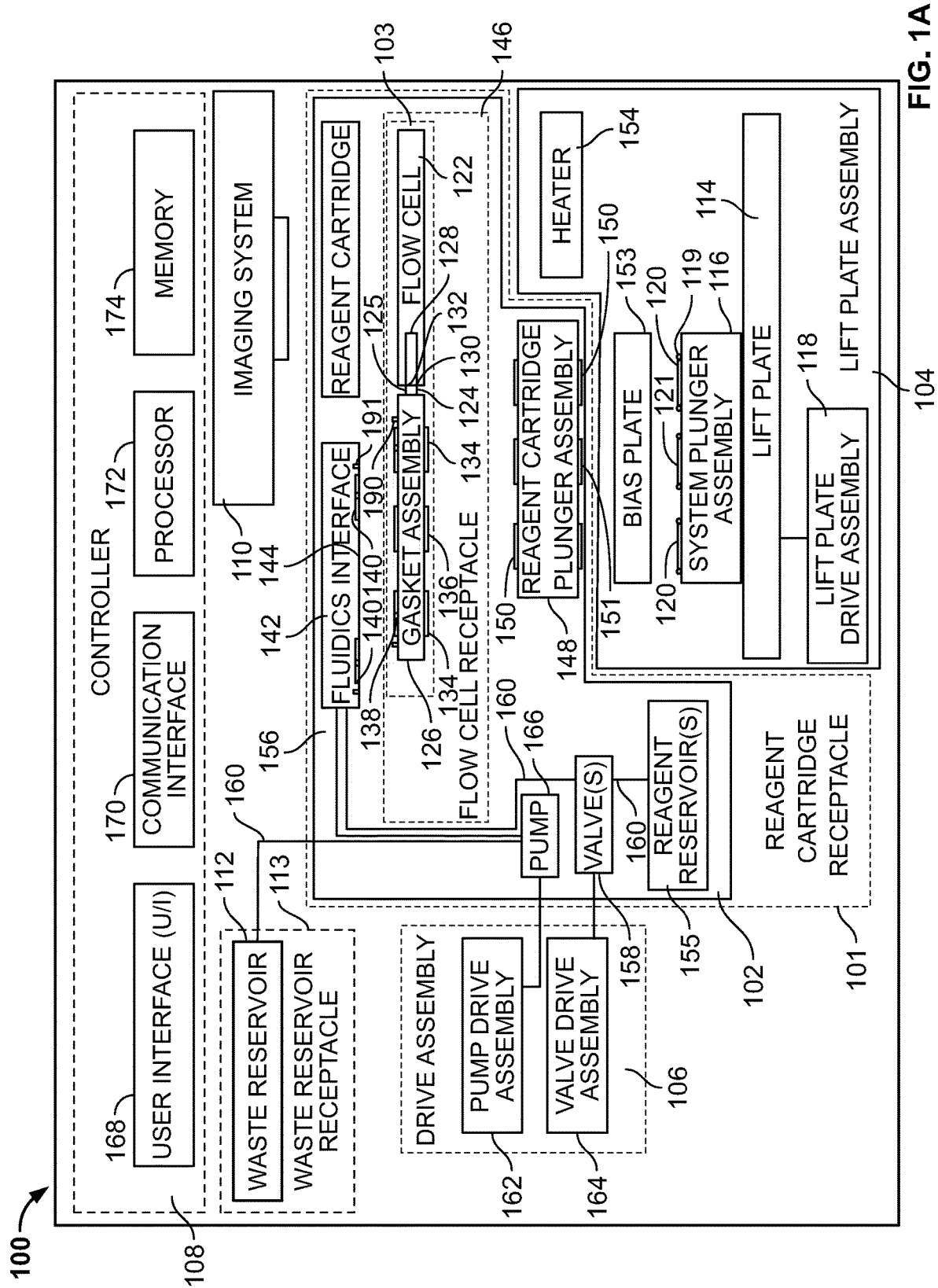
FIG. 1A illustrates a schematic diagram of an implementation of a system in accordance with a first example of the present disclosure.

FIG. 1A illustrates a schematic diagram of an implementation of a system 100 in accordance with a first example of the present disclosure. The system 100 can be used to perform an analysis on one or more samples of interest. The sample may include one or more DNA clusters that have been linearized to form a single stranded DNA (sstDNA). In the implementation shown, the system 100 includes a reagent cartridge receptacle 101 that is adapted to receive a reagent cartridge 102. The reagent cartridge 102 carries a flow cell assembly 103.

In the implementation shown, the system 100 includes, in part, a lift plate assembly 104, a drive assembly 106, a controller 108, an imaging system 110, and a waste reservoir 112. The controller 108 is electrically and/or communicatively coupled to the lift plate assembly 104, the drive assembly 106, and the imaging system 110 and is adapted to cause the lift plate assembly 104, the drive assembly 106, and/or the imaging system 110 to perform various functions as disclosed herein. The waste reservoir 112 may be selectively receivable within a waste reservoir receptacle 113 of the system 100 or may be part of the reagent cartridge 102.

The reagent cartridge 102 and/or the flow cell assembly 103 can carry one or more samples of interest. The lift plate assembly 104 interfaces with the reagent cartridge 102 to load the reagent cartridge 102 within the system 100. The drive assembly 106 interfaces with the reagent cartridge 102 to flow one or more reagents (e.g., A, T, G, C nucleotides) that interact with the sample through the reagent cartridge 102 and/or through the flow cell assembly 103.

In an implantation, a reversible terminator is attached to the reagent to allow a single nucleotide to be incorporated by the sstDNA per cycle. In some such implementations, one or more of the nucleotides has a unique fluorescent label that emits a color when excited. The color (or absence thereof) is used to detect the corresponding nucleotide. In the implementation shown, the imaging system 110 is adapted to excite one or more of the identifiable labels (e.g., a fluorescent label) and thereafter obtain image data for the identifiable labels. The labels may be excited by incident light and/or a laser and the image data may include one or more colors emitted by the respective labels in response to the excitation. The image data (e.g., detection data) may be analyzed by the system 100. The imaging system 110 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 106 interfaces with the reagent cartridge 102 to flow another reaction component (e.g., a reagent) through the reagent cartridge 102 and/or the flow cell assembly 103 that is thereafter received by the waste reservoir 112 and/or otherwise exhausted by the reagent cartridge 102. The reaction component performs a flushing operation that chemically cleaves the fluorescent label and the reversible terminator from the sstDNA. The sstDNA is then ready for another cycle.

Referring to the lift plate assembly 104, in the implementation shown, the lift plate assembly 104 includes a lift plate 114, a system plunger assembly 116, and a lift plate drive assembly 118. The system plunger assembly 116 may be referred to and/or be part of an actuation system. The system plunger assembly 116 is carried by the lift plate 114 and includes a plurality of system plungers 120, 121. The system plungers 120, 121 may be referred to as system pins or system actuators. One or more seals 119 may surround the system plungers 120, 121. The seals 119 may be adapted to sealingly engage, for example, the lift plate 114 and/or other components of the lift plate assembly 104 to deter fluid from entering the system 100 and/or the lift plate assembly 104. In some implementations, the lift plate assembly 104 includes one or more seats against which the corresponding seals 119 may mate with.

The lift plate drive assembly 118 is operatively coupled to the lift plate 114. In another implementation, the system plungers 120, 121 may be combined into a single-wider plunger with one or more contact points. For example, the system plungers 120, 121 may be implemented as a single plunger with three-equally spaced prongs. Other configurations and/or spacing arrangements may prove suitable.

The flow cell assembly 103 includes a flow cell 122, a fluidic coupling 124, 125, and a gasket assembly 126. In some implementations, the fluidic coupling 124, 125 may be omitted and the flow cell 122 may be integrated with the gasket assembly 126 and/or may otherwise integrate one or more components of the gasket assembly 126 directly with the flow cell 122, such as the flow cell gaskets 134, 136 described herein. The flow cell 122 includes at least one channel 128, a flow cell inlet 130, and a flow cell outlet 132. The channel 128 may be U-shaped or may be straight and extend across the flow cell 122. Other configurations of the channel 128 may prove suitable. If more than one channel 128 is provided, each of the channels 128 may have a dedicated flow cell inlet 130 and a dedicated flow cell outlet 132. A single flow cell inlet 130 may alternatively be fluidly coupled to more than one channel 128 via, for example, an inlet manifold. A single flow cell outlet 132 may alternatively be coupled to more than one channel via, for example, an outlet manifold.

The fluidic coupling 124, 125 is coupled to each of the flow cell inlet 130 and the flow cell outlet 132. The fluidic coupling 124 may include a first fluidic coupling 124 and a second fluidic coupling 125. The fluidic couplings 124, 125 may be combined. For example, the fluidic coupling 124, 125 may be formed of a single substrate or may be otherwise attached. Alternatively, the fluidic couplings 124, 125 may be separated (see, for example, FIG. 4).

In an implementation, the fluidic coupling 124, 125 is a flexible fluidic coupling. For example, the fluidic coupling 124, 125 may be formed by a laminate structure. The laminate structure may define corresponding flow paths. The fluidic coupling 124, 125 may be relatively fragile. Thus, if a force exceeding a threshold value is applied to the fluidic coupling 124, 125, the fluidic coupling 124, 125 may be damaged. Moreover, if a force greater than the threshold value is applied, a seal may not be established between the reagent cartridge 102 and the flow cell assembly 103. In some implementations, the fluidic couplings 124, 125 may be omitted and the flow cell 122 may be directly coupled to the gasket assembly 126 and/or the flow cell gaskets 134, 136 described herein.

The disclosed examples may be adapted to allow a fluidic connection to be established between the reagent cartridge 102 and the fluidic coupling 124, 125 of the flow cell assembly 103 without damaging the fluidic coupling 124, 125. While the fluidic coupling 124, 125 may be flexible, the fluidic coupling 124, 125 may be formed in other ways. For example, the fluidic coupling 124, 125 may be rigid or less flexible. In other implementations, the fluidic coupling 124, 125 may be removed and the gasket assembly 126 may be coupled directly to the flow cell 122. If the fluidic coupling 124, 125 is not provided or if the approach may prove suitable, the lift plate assembly 104 may apply a different compression to the reagent cartridge 102 and/or the flow cell assembly 103 than the compression applied to the gasket assembly 126. As such, the reagent cartridge 102/the flow cell assembly 103 may be secured and the gasket assembly 126 may not be damaged.

In the implementation shown, the gasket assembly 126 is coupled to the fluidic coupling 124, 125. The gasket assembly 126 includes a plurality of flow cell gaskets 134, 136. The flow cell gaskets 134, 136 may be elastic gaskets. One of the flow cell gaskets 134, which may be referred to as a flow cell inlet gasket, has a through bore 138 and is coupled to the flow cell inlet 130 via the fluidic coupling 124. Another of the flow cell gaskets 136, which may referred to as a flow cell outlet gasket, includes a through bore 138 and is coupled to the flow cell outlet 132 via the fluidic coupling 125. The flow cell gaskets 136 having the through bores 138 may be adapted to be in selective fluid communication with a pair of reagent cartridge ports 140 of a fluidics interface 142 of the reagent cartridge 102.

Another of the flow cell gaskets 136 may be referred to as a leveler flow cell gasket. The leveler flow cell gasket 136 may be adapted to engage a reagent cartridge engagement surface 144 of the fluidics interface 142. The reagent cartridge engagement surface 144 faces a flow cell receptacle 146 of the reagent cartridge 102. The flow cell gaskets 134 may be arranged in a triangular pattern (see, for example, FIG. 2). The triangular pattern may allow a repeatable fluidic coupling to be established between the flow cell gaskets 134 and the reagent cartridge ports 140. The triangular pattern may also allow the flow cell gaskets 134, 136 of the gasket assembly 126 to be planer with or relative to the reagent cartridge engagement surface 144. The triangular pattern may allow a force to be evenly distributed and/or consistently applied by the gasket assembly 126 to the reagent cartridge engagement surface 144. The leveler flow cell gasket 136 may allow the flow cell gaskets 134 to flushly engage the reagent cartridge ports 140.

In the implementation shown, the reagent cartridge 102 includes the flow cell receptacle 146, a reagent cartridge plunger assembly 148, and the pair of reagent cartridge ports 140. The reagent cartridge plunger assembly 148 may be referred to and/or be part of an actuation system. The flow cell receptacle 146 is adapted to receive the flow cell assembly 103. The reagent cartridge plunger assembly 148 includes a plurality of reagent cartridge plungers 150, 151. The reagent cartridge plungers 150, 151 may be referred to as reagent cartridge pins or reagent cartridge actuators. In some implementations, the reagent cartridge plunger assembly 148 may be omitted such that the system plunger assembly 116 directly engages the gasket assembly 126.

When the reagent cartridge 102 is received within the reagent cartridge receptacle 101 and the flow cell assembly 103 is received within the flow cell receptacle 146, as shown, each reagent cartridge plunger 150, 151 is aligned with a corresponding system plunger 120, 121 and a corresponding flow cell gasket 134, 136. The pair of reagent cartridge ports 140 is adapted to be fluidly coupled to the flow cell gaskets 134 having the through bores 138. In other implementations, the reagent cartridge 102 may not include the reagent cartridge plunger assembly 148.

In operation, the lift plate drive assembly 118 is adapted to linearly move the lift plate 114 and the system plungers 120, 121. The lift plate assembly 104 and/or the lift plate drive assembly 118 may be adapted to synchronize/coordinate the movement of various components of the reagent cartridge 102 and the flow cell assembly 103. The lift plate assembly 104 and/or the lift plate drive assembly 118 may be adapted to synchronize/coordinate the clamping force applied to, for example, the reagent cartridge 102 to clamp the reagent cartridge 102 within the reagent cartridge receptacle 101 and/or to clamp the flow cell assembly 103 within the flow cell receptacle 146.

The movement of the lift plate 114 causes the system plungers 120, 121 to engage and move the reagent cartridge plungers 150, 151 into engagement with or to otherwise interface with the gasket assembly 126. In an implementation where the reagent cartridge plungers 150, 151 are removed, the system plungers 120, 121 may be arranged to directly contact or otherwise interface with the gasket assembly 126. The engagement between the reagent cartridge plungers 150 and the gasket assembly 126 urges the flow cell gaskets 134, 136 into engagement with the reagent cartridge ports 140. The engagement between the reagent cartridge plungers 150 and the gasket assembly 126 allows fluid communication between the pair of reagent cartridge ports 140 and the flow cell 122 via the flow cell inlet 130 and the flow cell outlet 132. Thus, the system plungers 120, 121 are adapted to actuate the reagent cartridge plungers 150, 151. The reagent cartridge plungers 150, 151 are adapted to actuate the flow cell gaskets 134, 136 to establish a fluidic connection with the reagent cartridge ports 140. In some examples, hermetic seals are formed between the flow cell gaskets 134 and the reagent cartridge ports 140. The hermetic seals may allow the fluidic communication between the reagent cartridge 102 and the flow cell assembly 103.

The system plungers 120 include a pair of system plungers 120, the reagent cartridge plungers 150 include a pair of reagent cartridge plungers 150, and the flow cell gaskets 134 include the pair of the flow cell gaskets 134 having the through bores 138. The pair of system plungers 120, the pair of reagent cartridge plungers 150, and the pair of flow cell gaskets 134 are associated with fluidly coupling the flow cell 122 and the pair of reagent cartridge ports 140. The pair of system plungers 120, the pair of reagent cartridge plungers 150, and the pair of flow cell gaskets 134 are shown in the schematic illustration of FIG. 1 A on the left side and the right side of the system plunger assembly 116, the reagent cartridge plunger assembly 148, and the gasket assembly 126. However, the pair of system plungers 120, the pair of reagent cartridge plungers 150, and the pair of flow cell gaskets 134 may be differently arranged.

In the implementation shown, the system plungers 120, 121 include a leveler system plunger 121 and the reagent cartridge plungers 150, 151 include a leveler reagent cartridge plunger 151. The lift plate drive assembly 118 is adapted to linearly move the lift plate 114 and the leveler system plunger 121 to engage the gasket assembly 126 and to move the leveler reagent cartridge plunger 151 into engagement with the gasket assembly 126. The engagement between the leveler reagent cartridge plunger 151 and the gasket assembly 126 allows the leveler flow cell gasket 136 to engage the reagent cartridge engagement surface 144 and provide stability for the gasket assembly 126 against the reagent cartridge 102.

The lift plate assembly 104 also includes a bias plate 153. The bias plate 153 is adapted to engage the reagent cartridge 102. The engagement between the bias plate 153 and the reagent cartridge 102 may secure the reagent cartridge 102 within the reagent cartridge receptacle 102.

In the implementation shown, the lift plate assembly 104 includes a heater 154. The controller 108 is electrically and/or communicatively coupled to the heater 154 to perform various functions as disclosed herein. The lift plate drive assembly 118 is adapted to linearly move the lift plate 114 and the heater 154 toward the flow cell 122. The heater 154 may interface with the flow cell 122 to control a temperature of the flow cell 122 during one or more operations of the system 100 and/or an analysis taking place.

Referring back to the reagent cartridge 102, in the implementation shown, the reagent cartridge 102 includes reagent reservoirs 155, a reagent cartridge body 156, one or more valves 158, and fluidic lines 160. The reagent reservoirs 155 may contain fluid (e.g., reagent and/or another reaction component) and the valves 158 may be selectively actuatable to control the flow of fluid through the fluidic lines 160. One or more of the valves 158 may be implemented by a rotary valve, a pinch valve, a flat valve, a solenoid valve, a check valve, a piezo valve, etc. The reagent cartridge body 156 may be formed of solid plastic using injection molding techniques and/or additive manufacturing techniques. In some implementations, the reagent reservoirs 155 are integrally formed with the reagent cartridge body 156. In other implementations, the reagent reservoirs 155 are separately formed and coupled to the reagent cartridge body 156.

The reagent cartridge 102 may be in fluid communication with the flow cell assembly 103 via, for example, the interaction between the pair of reagent cartridge ports 140 and the flow cell gaskets 134, 136. In the implementation shown, the flow cell assembly 103 can be inserted into and carried by the reagent cartridge 102 and is received in the flow cell receptacle 146. Alternatively, the flow cell assembly 103 can be integrated into the reagent cartridge 102. In such implementations, the flow cell receptacle 146 may not be included or, at least, the flow cell assembly may not be removably receivable within the reagent cartridge 102.

Referring now to the drive assembly 106, in the implementation shown, the drive assembly 106 includes a pump drive assembly 162 and a valve drive assembly 164. The pump drive assembly 162 is adapted to interface with one or more pumps 166 to pump fluid through the reagent cartridge 102. The pump 166 may be implemented by a syringe pump, a peristaltic pump, a diaphragm pump, etc. While the pump 166 may be positioned between the flow cell assembly 103 and the waste reservoir 112, in other implementations, the pump 166 may be positioned upstream of the flow cell 122 or omitted entirely.

The valve drive assembly 164 is adapted to interface with the one or more valves 158 to control the position of the valves 158. In an implementation, the valve 158 is implemented by a rotary valve having a first position that blocks flow to the flow cell 122 and a second position that allows flow from the reagent reservoir 155 to the flow cell 122. However, the valve 158 may be positioned in any number of positions to flow any one or more of a first reagent, a buffer reagent, a second reagent, etc. to the flow cell 122. In such implementations, the valve drive assembly 164 may include a shaft that actuates the valve 158 to perform operations where reagent from one or more of the reagent reservoirs 155 is flowed through the flow cell 122.

Referring to the controller 108, in the implementation shown, the controller 108 includes a user interface 168, a communication interface 170, one or more processors 172, and a memory 174 storing instructions executable by the one or more processors 172 to perform various functions including the disclosed implementation. The user interface 168, the communication interface 170, and the memory 174 are electrically and/or communicatively coupled to the one or more processors 172.

In an implementation, the user interface 168 is adapted to receive input from a user and to provide information to the user associated with the operation of the system 100 and/or an analysis taking place. The user interface 168 may include a touch screen, a display, a key board, a speaker(s), a mouse, a track ball and/or a voice recognition system. The touch screen and/or the display may display a graphical user interface (GUI).

In an implementation, the communication interface 170 is adapted to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 172 and/or the system 100 may include one or more of a processor-based system(s) or a microprocessor-based system(s). In some implementations, the one or more processors 172 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 174 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache and/or any other storage device or storage disk in which information is stored for any duration (e.g., permanently, temporarily, for extended periods of time, for buffering, for caching).

Figure 1B:
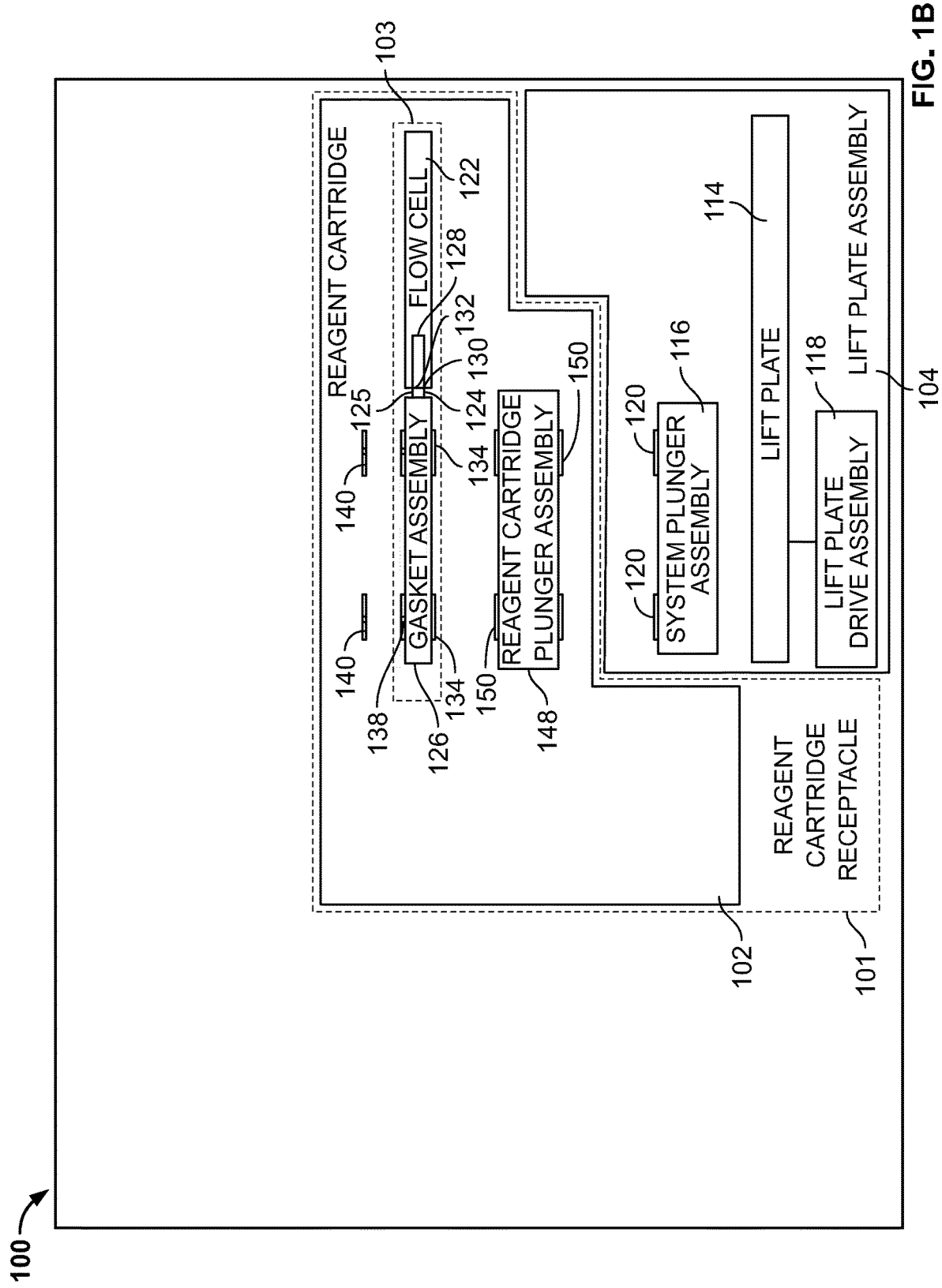
FIG. 1B illustrates a schematic diagram of another example implementation of the system of FIG. 1A.
Figure 1C:
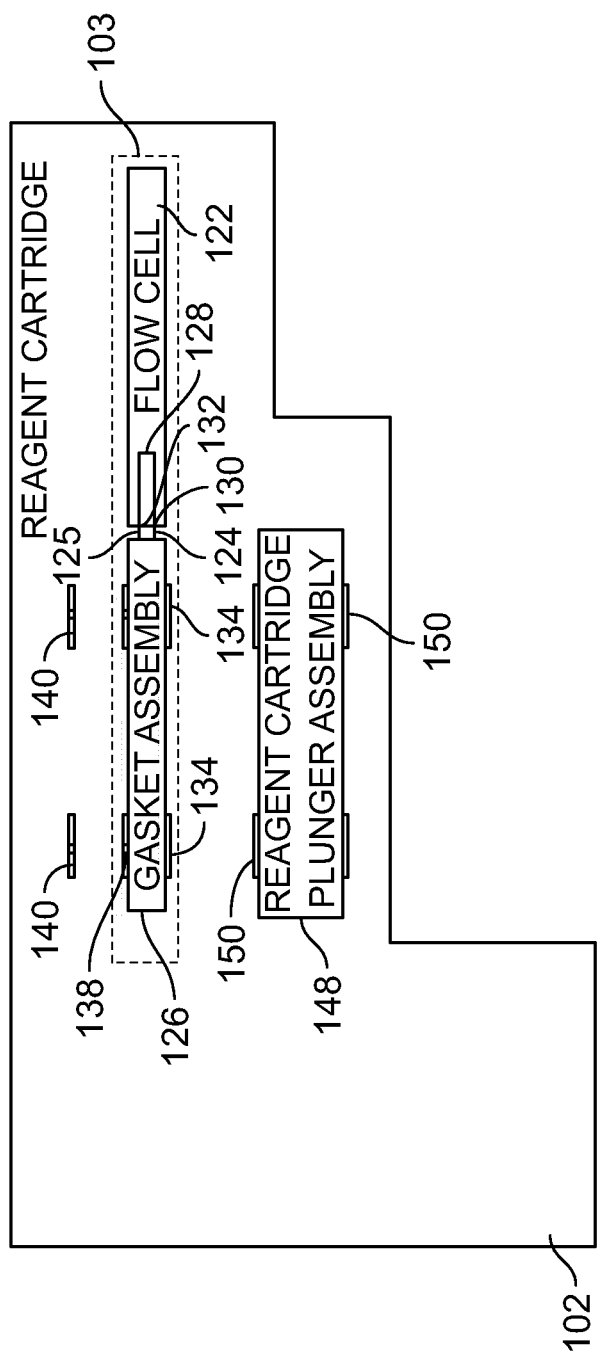
FIG. 1C illustrates a schematic diagram of another example implementation of the flow cell assembly and the reagent cartridge of the system of FIG. 1A.

FIG. 1B illustrates a schematic diagram of another example implementation of the system 100 of FIG. 1A. In the implementation shown in FIG. 1B, the system 100 includes the reagent cartridge receptacle 101 and the lift plate assembly 104. The lift plate assembly 104 includes the lift plate 114, the system plunger assembly 116, and the lift plate drive assembly 118. The system plunger assembly 116 is carried by the lift plate 114 and includes the plurality of system plungers 120. The lift plate drive assembly 118 is operatively coupled to the lift plate 114.

The flow cell assembly 103 includes the flow cell 122 including at least one channel 128, the flow cell inlet 130, and the flow cell outlet 132. The flow cell assembly 103 also includes the fluidic coupling 124, 125 coupled to each of the flow cell inlet 130 and the flow cell outlet 132. The flow cell assembly 103 includes the gasket assembly 126 coupled to the fluidic coupling 124, 125. The gasket assembly 126 includes the flow cell inlet gasket 134 and the flow cell outlet gasket 134. The flow cell inlet gasket 134 includes the through bore 138 and is coupled to the flow cell inlet 130 via the fluidic coupling 124, 125. The flow cell outlet gasket 134 includes the through bore 138 and is coupled to the flow cell outlet 132 via the fluidic coupling 124, 125.

In the implementation shown, the reagent cartridge 102 is receivable within the reagent cartridge receptacle 101 and includes the reagent cartridge plunger assembly 148 and the pair of reagent cartridge ports 140. The reagent cartridge plunger assembly 148 includes the plurality of reagent cartridge plungers 150. Each reagent cartridge plunger 150 is adapted to be aligned with a corresponding system plunger 120 of the system plunger assembly 116 and a corresponding flow cell gasket 134 of the flow cell assembly 103 when the reagent cartridge 102 is received within the reagent cartridge receptacle 101. The pair of reagent cartridge ports 140 is adapted to be fluidly coupled to the flow cell inlet gasket 134 and the flow cell outlet gasket 134.

Figure 10:
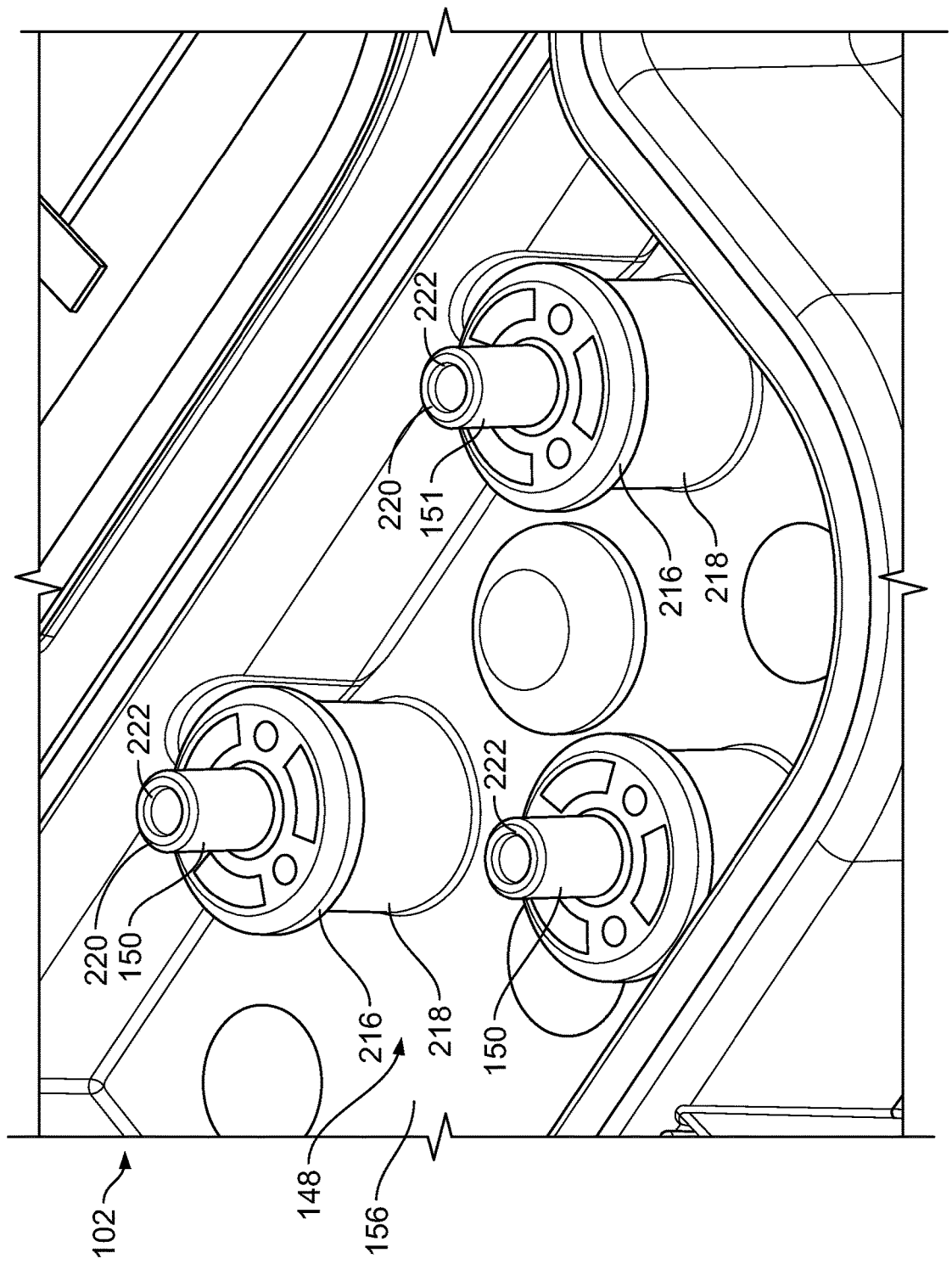
FIG. 10 is an isometric enlarged cross-sectional view of the reagent cartridge showing the reagent cartridge plunger assembly of FIG. 6.

FIG. 10 illustrates a schematic diagram of another example implementation of the flow cell assembly 103 and the reagent cartridge 102 of the system 100 of FIG. 1A. In the implementation shown, the flow cell assembly 103 includes the flow cell 122 and the gasket assembly 126. The flow cell 103 includes at least one channel 128, the flow cell inlet 130, and the flow cell outlet 132. The gasket assembly 126 is operatively coupled to the flow cell 103 and includes the flow cell inlet gasket 134 and the flow cell outlet gasket 134. The flow cell inlet gasket 134 includes the through bore 138 and is coupled to the flow cell inlet 130. The flow cell outlet gasket 134 includes the through bore 138 and is coupled to the flow cell outlet 132. The reagent cartridge 102 is adapted to carry the flow cell assembly 103 and includes the pair of reagent cartridge ports 140. The reagent ports 140 are adapted to be fluidly coupled to the flow cell inlet gasket 134 and the flow cell outlet gasket 134.

Figure 2:
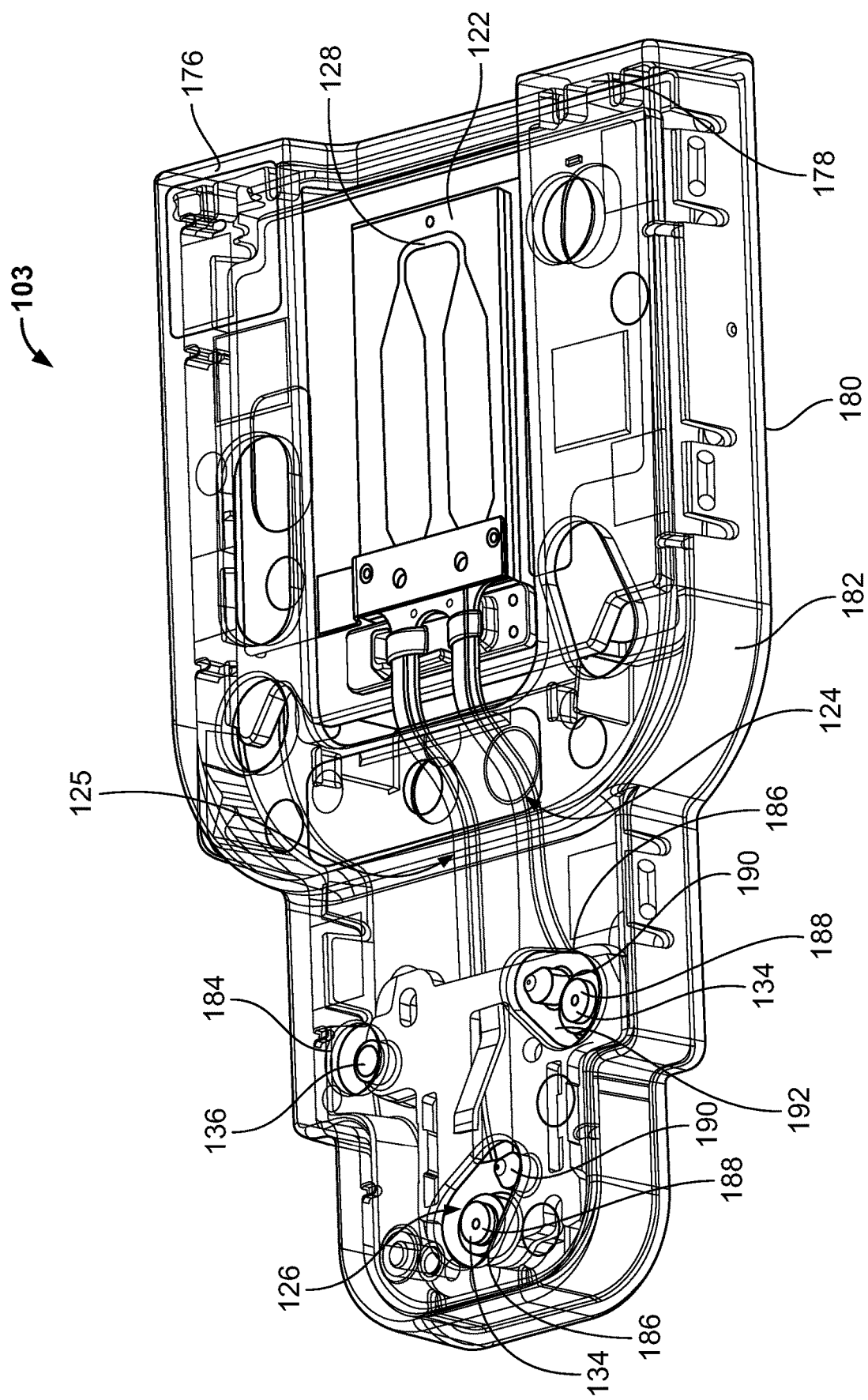
FIG. 2 is an isometric top view of an example implementation of the flow cell assembly of FIG. 1A.

FIG. 2 is an isometric top view of an example implementation of the flow cell assembly 103 of FIG. 1A. The flow cell assembly 103 includes a flow cell housing 176. The flow cell housing 176 includes a top housing surface 178, a bottom housing surface 180, and side housing surfaces 182. The top housing surface 178, the bottom housing surface 180, and the side housing surfaces 182 form an enclosure. As shown, the enclosure may have one or more openings. In the implementation shown, the top housing surface 178 can include surfaces in one or more planes.

The flow cell housing 176 carries the flow cell 122, the fluidic coupling 124, 125 (more clearly shown in FIG. 4), and the gasket assembly 126. In the implementation shown, the flow cell housing 176 has a dimensional envelope and the gasket assembly 126 is disposed within the dimensional envelope of the flow cell housing 176. Positioning the gasket assembly 126 within the dimensional envelope of the flow cell housing 176 allows the flow cell assembly 103 to be received within the flow cell receptacle 146 and/or to be carried within the flow cell receptacle 146 without the gasket assembly 126 and/or the flow cell gaskets 134, 136 being damaged as the gasket assembly 126 and/or the flow cell gaskets 134, 136 can be positioned as to not protrude out from the enclosure. For example, if the gasket assembly 126 extended outside of the dimensional envelope of the flow cell housing 176, the flow cell gaskets 134, 136 may inadvertently engage with structures of the reagent cartridge 102 during assembly and/or transport that may damage and/or otherwise affect the ability of a fluidic connection being established between the gasket assembly 126 and the pair of reagent cartridge ports 140.

The flow cell housing 176 also includes openings 184, 186 that correspond to each of the flow cell gaskets 134, 136. The openings 184, 186 are arranged in a triangular pattern. The top housing surface 178 defines the openings 184, 186. In the implementation shown, the opening 184 is circular and the openings 186 are oblong and/or tear drop shaped. The openings 184, 186 defined by the top housing surface 178 are arranged to allow the flow cell gaskets 134, 136 to protrude from the dimensional envelope of the flow cell housing 176 after the reagent cartridge plungers 150 move the gasket assembly 126 a predetermined distance.

The flow cell gaskets 134, 136 have a circular cross-section. The flow cell gaskets 134, 136 also include a flat surface 188. The flat surfaces 188 of the flow cell gaskets 134, 136 may be arranged to engage and/or compress against the reagent cartridge engagement surface 144 when the pair of reagent cartridge ports 140 are in communication with the flow cell 122 via the flow cell inlet 130 and the flow cell outlet 132. The flat surface 188 of the flow cell gaskets 134, 136 may be adapted to be pressed flushly against the reagent cartridge engagement surface 144. The interaction between the flat surface 188 and the reagent cartridge engagement surface 144 may allow the force applied by the gasket assembly 126 to be evenly distributed against the reagent cartridge engagement surface 144. The interaction between the flat surface 188 and the reagent cartridge engagement surface 144 may allow a hermetic seal to be formed between the flow cell gaskets 134 and the reagent cartridge ports 140.

The gasket assembly 126 also includes alignment protrusions 190. The alignment protrusions 190 are adapted to be received by alignment receptacles 191 (see, FIG. 1A) of the reagent cartridge 102. The alignment protrusions 190 extend from a gasket surface 192 toward the top housing surface 178 and are positioned proximate to the flow cell gaskets 134. The oblong openings 186 are sized to allow the alignment protrusions 190 to extend through the oblong openings 186. For example, the alignment protrusions 190 may be urged through the oblong openings 186 and outside of the dimensional envelope of the flow cell housing 176 after the reagent cartridge plungers 150, 151 engage the gasket assembly 126 and move the flow cell gaskets 134, 136 a threshold distance. Accordingly, the alignment protrusions 190 may engage with the alignment receptacles 191 of the reagent cartridge 102 to align the through bores 138 of the flow cell gaskets 134 of the gasket assembly 126 with corresponding openings of the reagent cartridge ports 140 prior to or concurrent with forming the hermetic or substantially hermetic seal.

Figure 3:
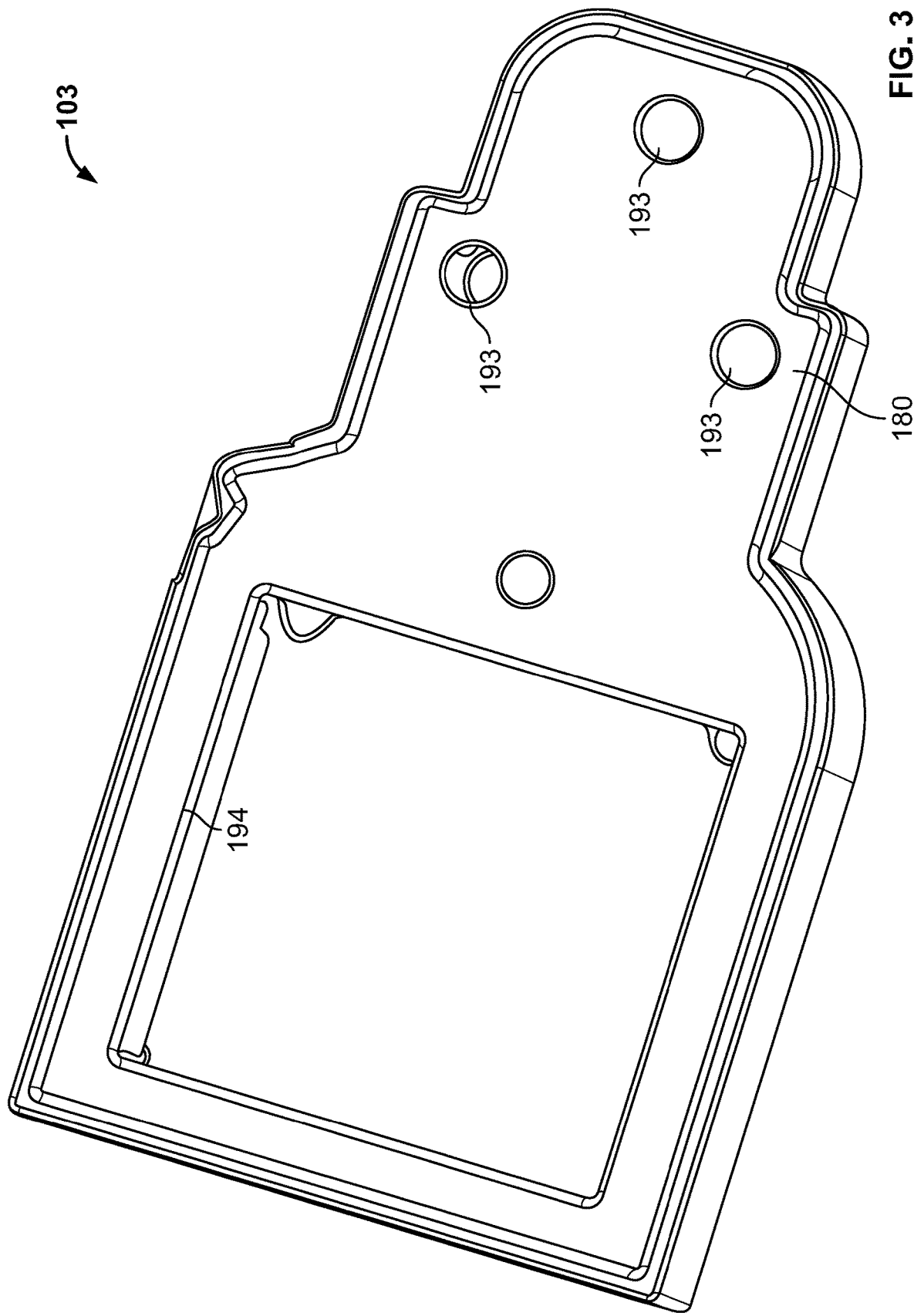
FIG. 3 is an isometric bottom view of the flow cell assembly shown in FIG. 2.

FIG. 3 is an isometric bottom view of the flow cell assembly 103 shown in FIG. 2. The bottom housing surface 180 of the flow cell assembly 103 includes openings 193. The openings 193 are circular in the present implementation, but other geometric openings can be used, such as slots, ovals, etc. The openings 193 oppose the openings 184, 186 of the top housing surface 178. The openings 193 are arranged in a triangular pattern. The openings 193 are adapted to receive the reagent cartridge plungers 150, 151 to allow the reagent cartridge plungers 150, 151 to interface with the gasket assembly 126. The bottom housing surface 180 also includes a heater opening 194. The heater opening 194 may be adapted to allow the heater 154 to interface with the flow cell 122 and/or a carrier plate supporting the flow cell 122. For example, the heater opening 194 may be adapted to receive the heater 154.

Figure 4:
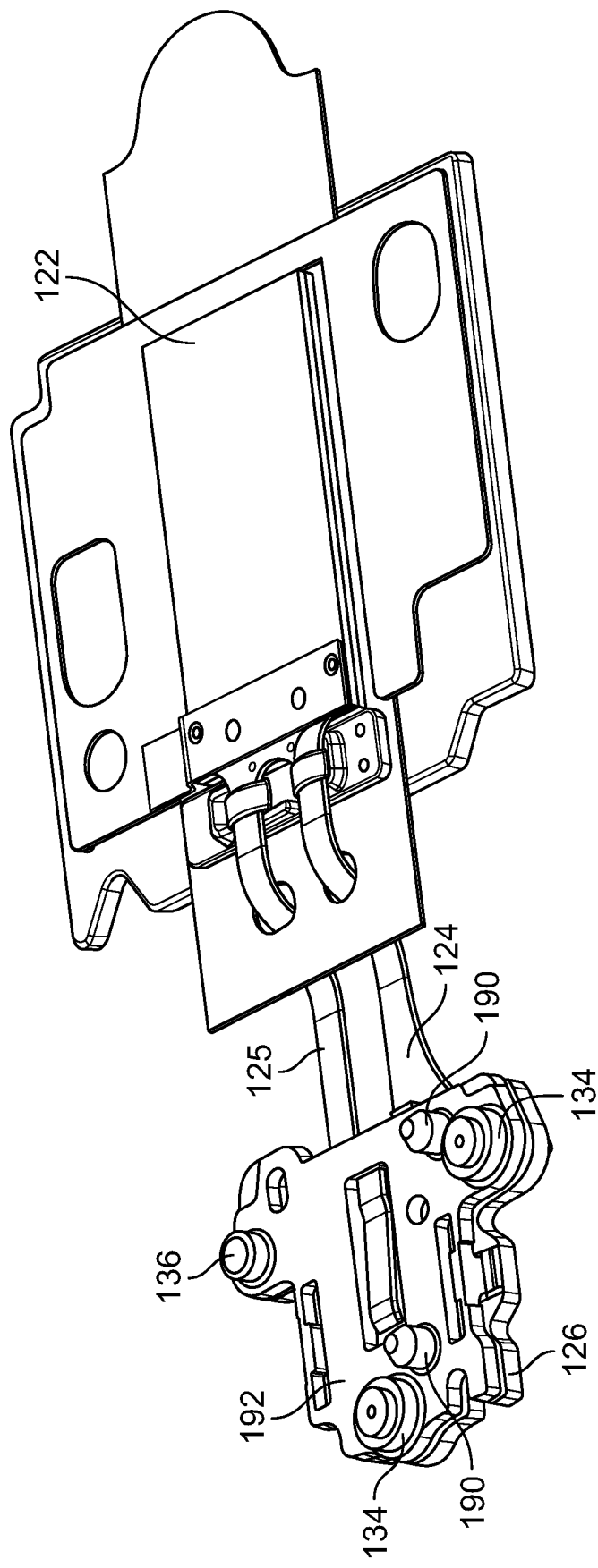
FIG. 4 is an isometric top view of the flow cell, the fluidic coupling, and the gasket assembly of FIG. 2.

FIG. 4 is an isometric top view of the flow cell 122, the fluidic coupling 124, 125, and the gasket assembly 126 of FIG. 2 with the enclosure removed. In the implementation shown, the alignment protrusions 190 are conical or include conical end portions. The conical end portions of the alignment protrusions 190 are receivable within the alignment receptacles 191. The conical end portions of the alignment protrusions 190 may be adapted to align the gasket assembly 126 and the flow cell gaskets 134, 136 when the gasket assembly 126 is being moved toward the reagent cartridge engagement surface 144.

Figure 5:
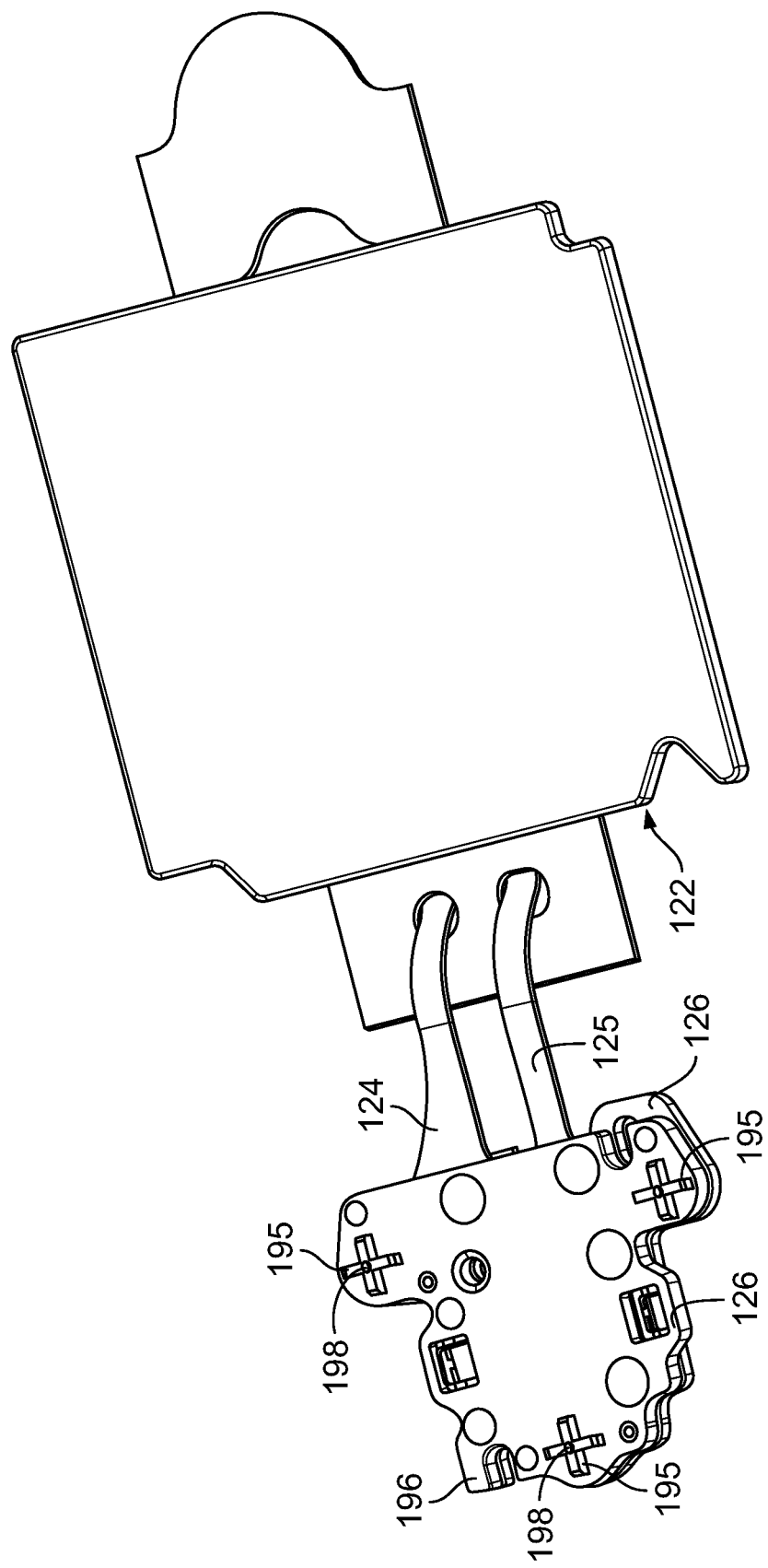
FIG. 5 is an isometric bottom view of the flow cell, the fluidic coupling, and the gasket assembly of FIG. 2.

FIG. 5 is an isometric bottom view of the flow cell 122, the fluidic coupling 124, 125, and the gasket assembly 126 of FIG. 2. In the implementation shown, the gasket assembly 126 includes a plurality of engagement protrusions 195. The engagement protrusions 195 extend from a lower surface 196 of the gasket assembly 126. The engagement protrusions 195 are formed by intersecting ribs. The engagement protrusions 195 may include a plunger receptacle 198. The plunger receptacle 198 is positioned at the intersection of the ribs. The plunger receptacle 198 may be adapted to receive a distal end 200 (see, FIG. 18) of the reagent cartridge plunger 150, 151 and/or the system plunger 120, 121. In another implementation, the plunger receptacle 198 is surrounded by the distal end 200 of the reagent cartridge plunger 150, 151 and/or the system plunger 120, 121. The distal end 200 of the reagent cartridge plunger 150, 151 may be a bored cylinder. The bored cylinder of the distal end 200 may engage the ribs of the engagement protrusion 195 to interface and/or surround the plunger receptacle 198. Engaging the engagement protrusion 195 with the distal end 200 including the bored cylinder may allow for the force exerted by the reagent cartridge plungers 150 and/or 151 and against the engagement protrusions 195 to be more evenly dispersed. In some implementations, the engagement protrusions 195 may be omitted and the distal end 200 of the reagent cartridge plunger 150, 151 may directly engage a bottom surface of the gasket assembly 126.

Figure 6:
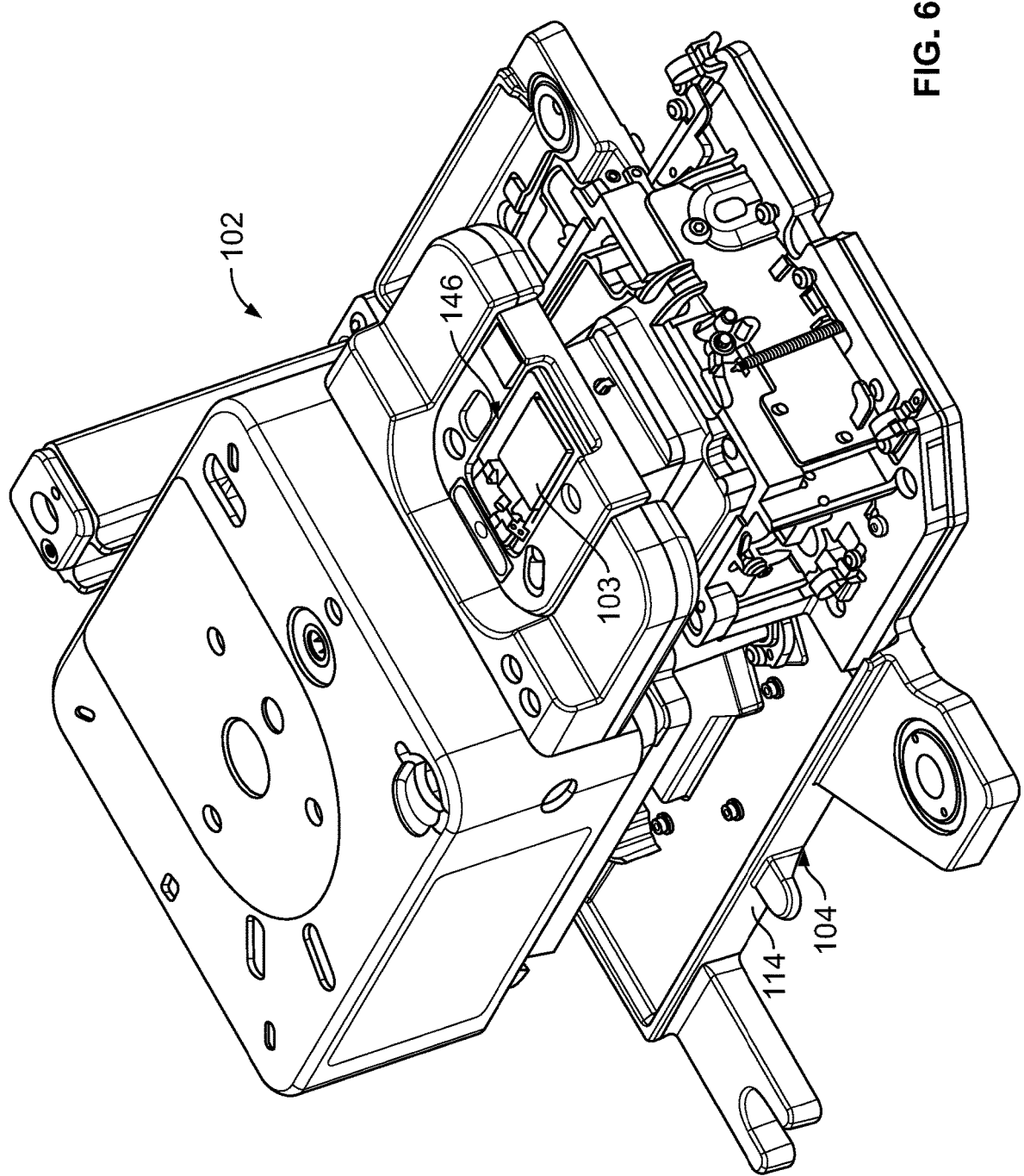
FIG. 6 is an isometric top view of an example implementation of the lift plate assembly and the reagent cartridge of FIG. 1A.

FIG. 6 is an isometric top view of an example implementation of the lift plate assembly 104 and the reagent cartridge 102 of FIG. 1A. In the implementation shown, the lift plate assembly 104 includes the lift plate 114. The reagent cartridge 102 is positioned above the lift plate 114 with the flow cell assembly 103 shown inserted into the reagent cartridge 102. The reagent cartridge 102 includes the flow cell receptacle 146 that is adapted to receive the flow cell assembly 103.

Figure 7:
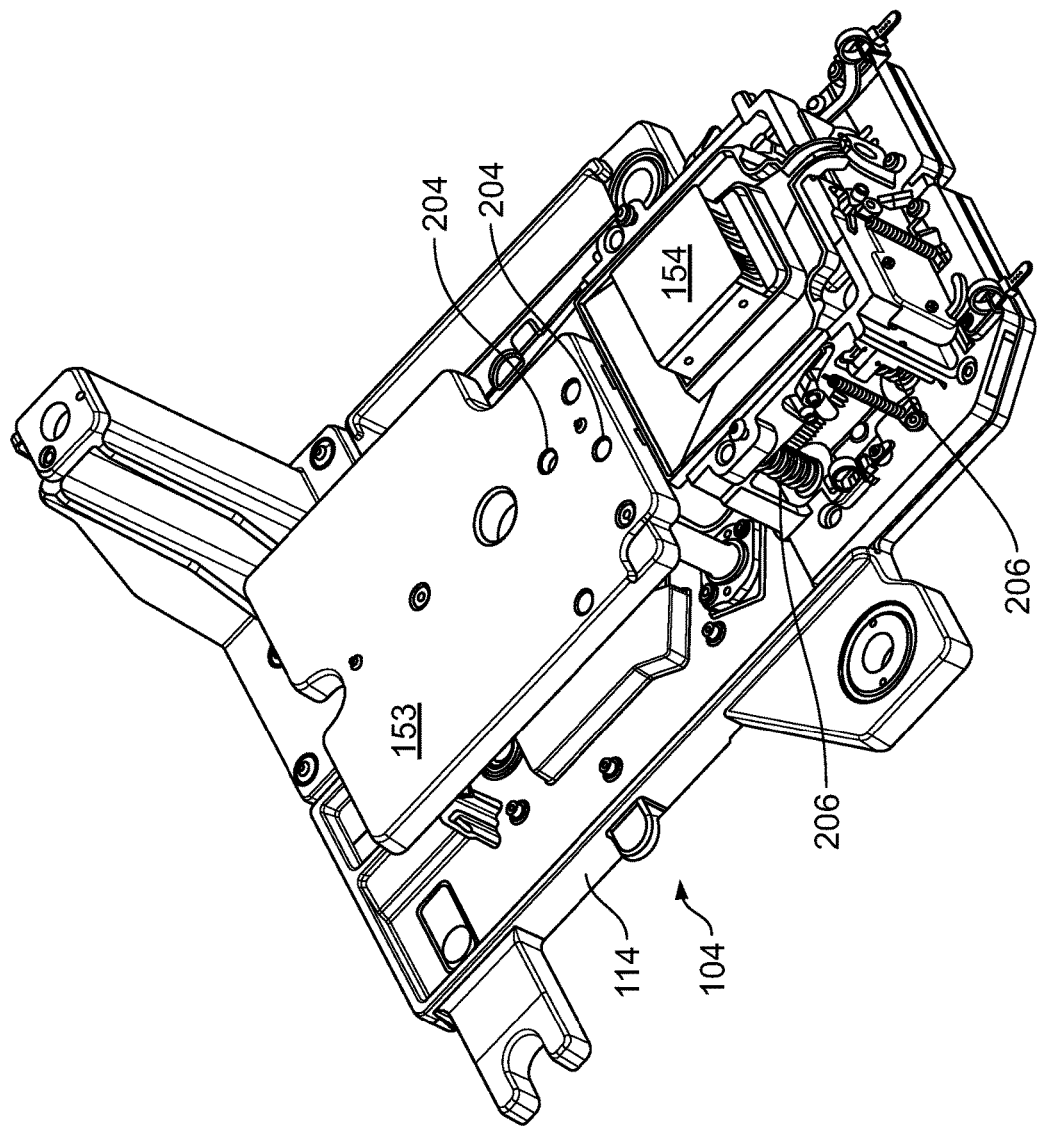
FIG. 7 is an isometric top view of the lift plate assembly of FIG. 6 including an example implementation of the bias plate.

FIG. 7 is an isometric top view of the lift plate assembly 104 of FIG. 6 including an example implementation of the bias plate 153. In the implementation shown, the bias plate 153 includes a plurality of bias plate through bores 204. The system plungers 120, 121 are arranged to extend through the bias plate through bores 204 to align with and permit the system plungers 120, 121 to interface with corresponding reagent cartridge plungers 150, 151. The bias plate through bores 204 are arranged in a triangular pattern. The lift plate assembly 104 also includes a plurality of springs 206. One or more of the springs 206 are disposed between a heater assembly carrying the heater 154 and the lift plate 114. The springs 206 may be adapted to provide an increasing counter directional force as the heater 154, the bias plate 153, and/or the system plungers 120, 121 move into engagement and/or toward a corresponding part of the reagent cartridge 102. The springs 206 may have a spring force to prevent damage of the corresponding part and/or to encourage a hermetic seal to be established between the reagent cartridge 102 and the flow cell assembly 103 based on Hooke's law for the springs.

Figure 8:
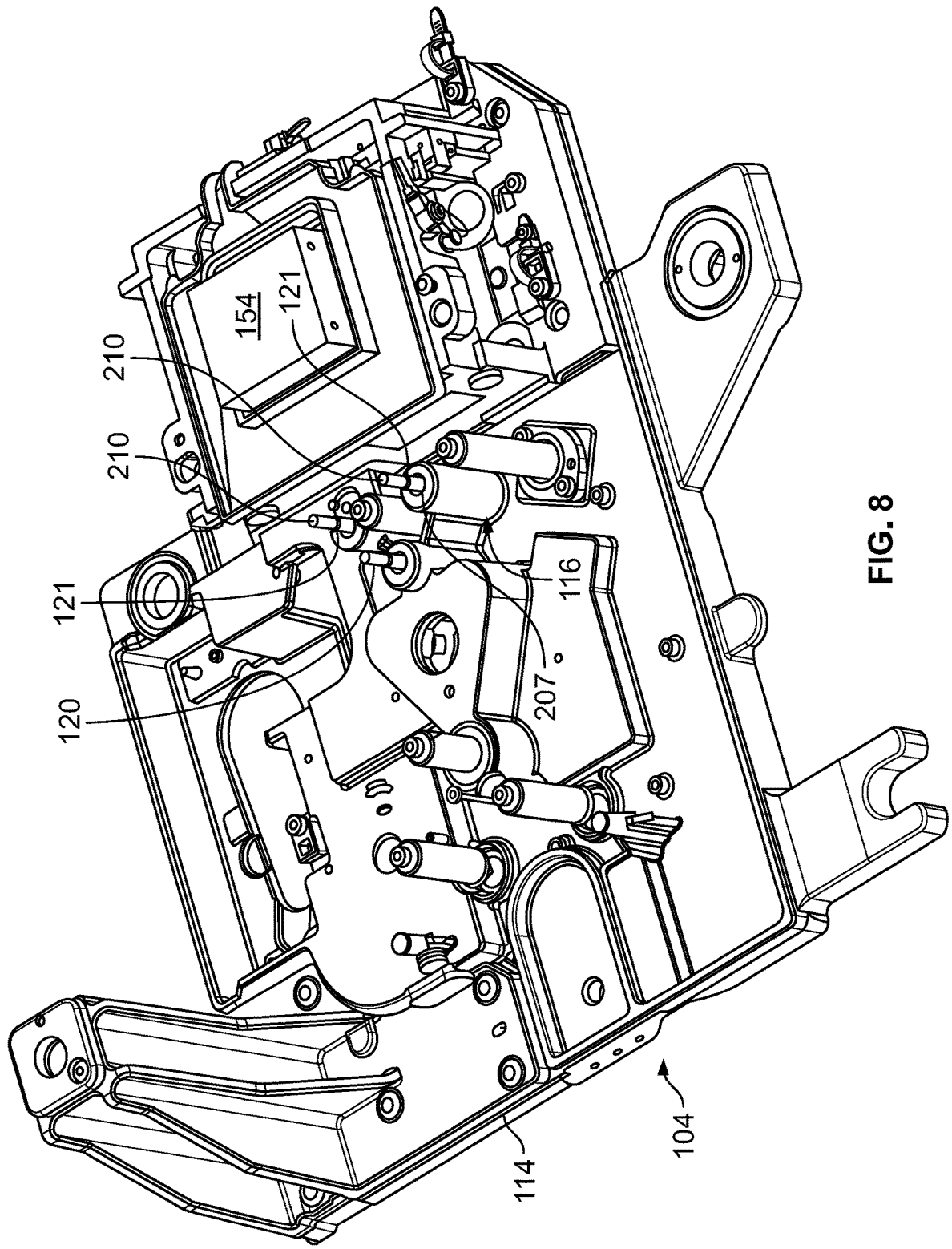
FIG. 8 is an isometric top view of the lift plate assembly of FIG. 6 with the bias plate removed.

FIG. 8 is an isometric top view of the lift plate assembly 104 of FIG. 6 with the bias plate 153 removed. Thus, the system plunger assembly 116 and the system plungers 120, 121 are shown. The lift plate 114 defines plunger bores 207. Each of the system plungers 120, 121 is slidably disposed within a corresponding one of the plunger bores 207. Springs 208 (see, for example, FIG. 12) may be housed within each of the plunger bores 207. The springs 208 may be arranged to act on the system plungers 120, 121 to provide an increasing counter directional force as a distal end 210 of each of the system plungers 120, 121 moves into engagement with a corresponding reagent cartridge plunger 150, 151. The springs 208 that act on the system plungers 120, 221 may be adapted to prevent the system plungers 120, 121 from compressing a corresponding flow cell gasket 134, 136 above a threshold amount based on Hooke's law for the springs. Over compressing the flow cell gaskets 134, 136 may cause damage and/or may prevent a seal from being established.

Figure 9:
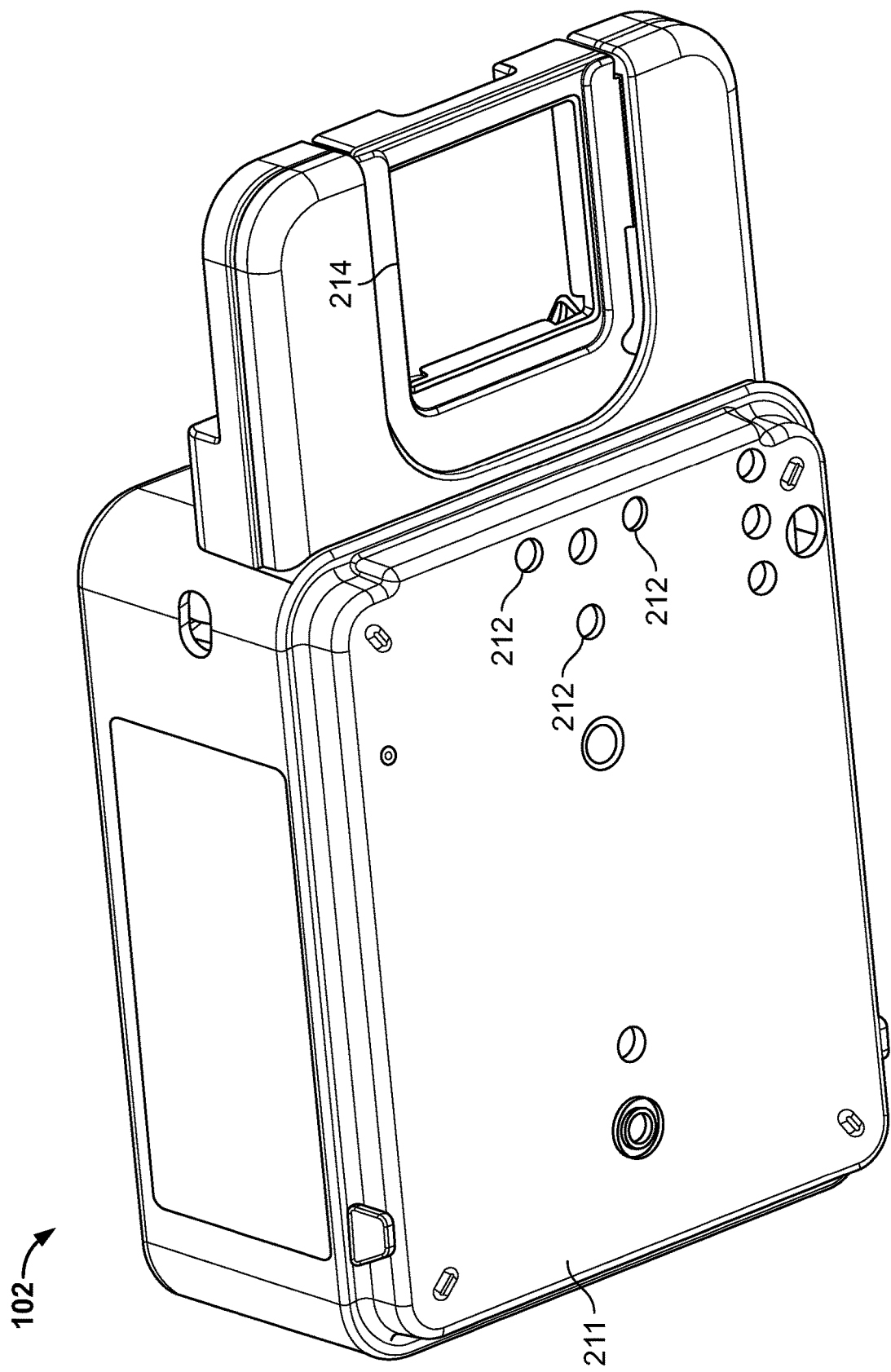
FIG. 9 is an isometric bottom view of the reagent cartridge of FIG. 6.

FIG. 9 is an isometric bottom view of the reagent cartridge 102 of FIG. 6. In the implementation shown, the reagent cartridge 102 includes a bottom surface 211. The bottom surface 211 defines a plurality of reagent cartridge bores 212. The system plungers 120, 121 are arranged to extend through the reagent cartridge bores 212 to interface with the reagent cartridge plungers 150, 151 retained within the reagent cartridge 102. The reagent cartridge bores 212 are arranged in a triangular pattern to correspond to the pattern of the system plungers 120, 121. The reagent cartridge 102 also includes a receptacle 214. The receptacle 214 may be arranged to receive the heater 154 and/or to allow the heater 154 to interface with the flow cell 122 and/or a carrier plate upon which the flow cell 122 is mounted.

FIG. 10 is an isometric enlarged cross-sectional view of the reagent cartridge 102 of FIG. 6 showing the reagent cartridge plunger assembly 148. In the implementation shown, the reagent cartridge body 156 of the reagent cartridge 102 includes plunger bores 216. The plunger bores 216 align with the reagent cartridge bores 212. The plunger bores 216 house the reagent cartridge plungers 150, 151. The reagent cartridge 102 includes projections 218. The projections 218 define the plunger bores 216. However, the reagent cartridge plungers 150, 151 may be carried by the reagent cartridge 102 in different ways. Distal ends 200 of the reagent cartridge plungers 150, 151 may include a seat 222. The seats 222 may be adapted to receive and/or otherwise interface with the plunger receptacle 198 of the gasket assembly 126. The reagent cartridge plunger 150, 151 include a proximal end (not shown) opposite the distal ends 200 that engage with distal ends 210 of the system plungers 120, 121.

Figure 11:
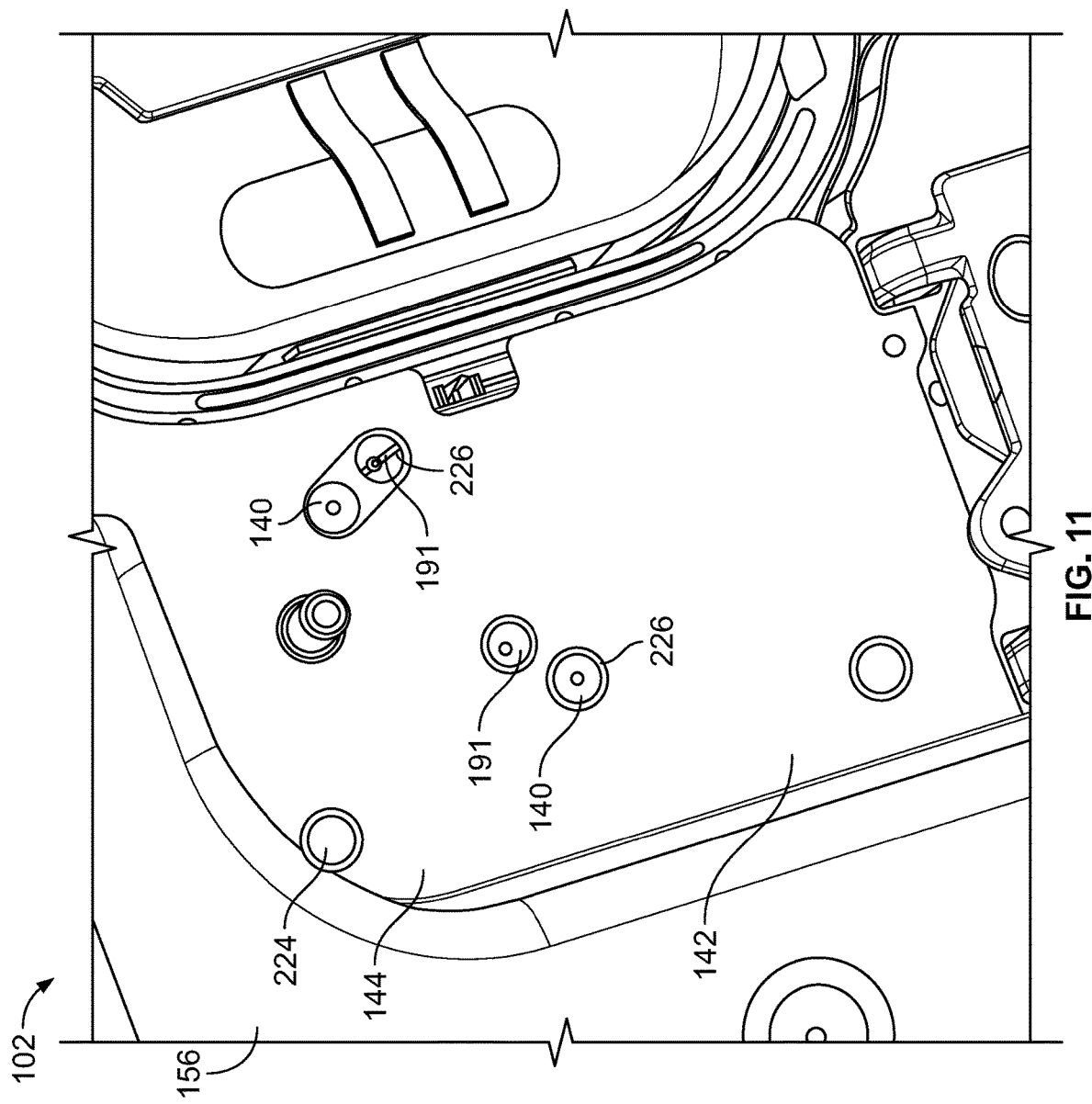
FIG. 11 is an isometric enlarged cross-sectional view of the reagent cartridge showing the reagent cartridge engagement surface, the reagent cartridge ports, and the alignment receptacles of FIG. 6.

FIG. 11 is an isometric enlarged cross-sectional view of the reagent cartridge 102 of FIG. 6 showing the fluidics interface 142, the reagent cartridge engagement surface 144, the reagent cartridge ports 140, and the alignment receptacles 191. The alignment receptacles 191 may have a conical surface that corresponds to the conical surface of the alignment protrusions 190. In the implementation shown, the reagent cartridge engagement surface 144 may include a seat 224. The seat 224 may be adapted to receive the flow cell gasket 136 that does not include the through bore 138. The reagent cartridge ports 140 may include port seats 226. The port seats 226 may be adapted to receive the flow cell gaskets 136. The port seats 226 may facilitate the hermetic seal being formed with the flow cell gaskets 136 having the through bores 138.

FIGS. 12-17 depict a process of loading/securing the reagent cartridge 102 within the reagent cartridge receptacle 101 and establishing a fluidic connection between the reagent cartridge 102 and the flow cell assembly 103.

Figure 12:
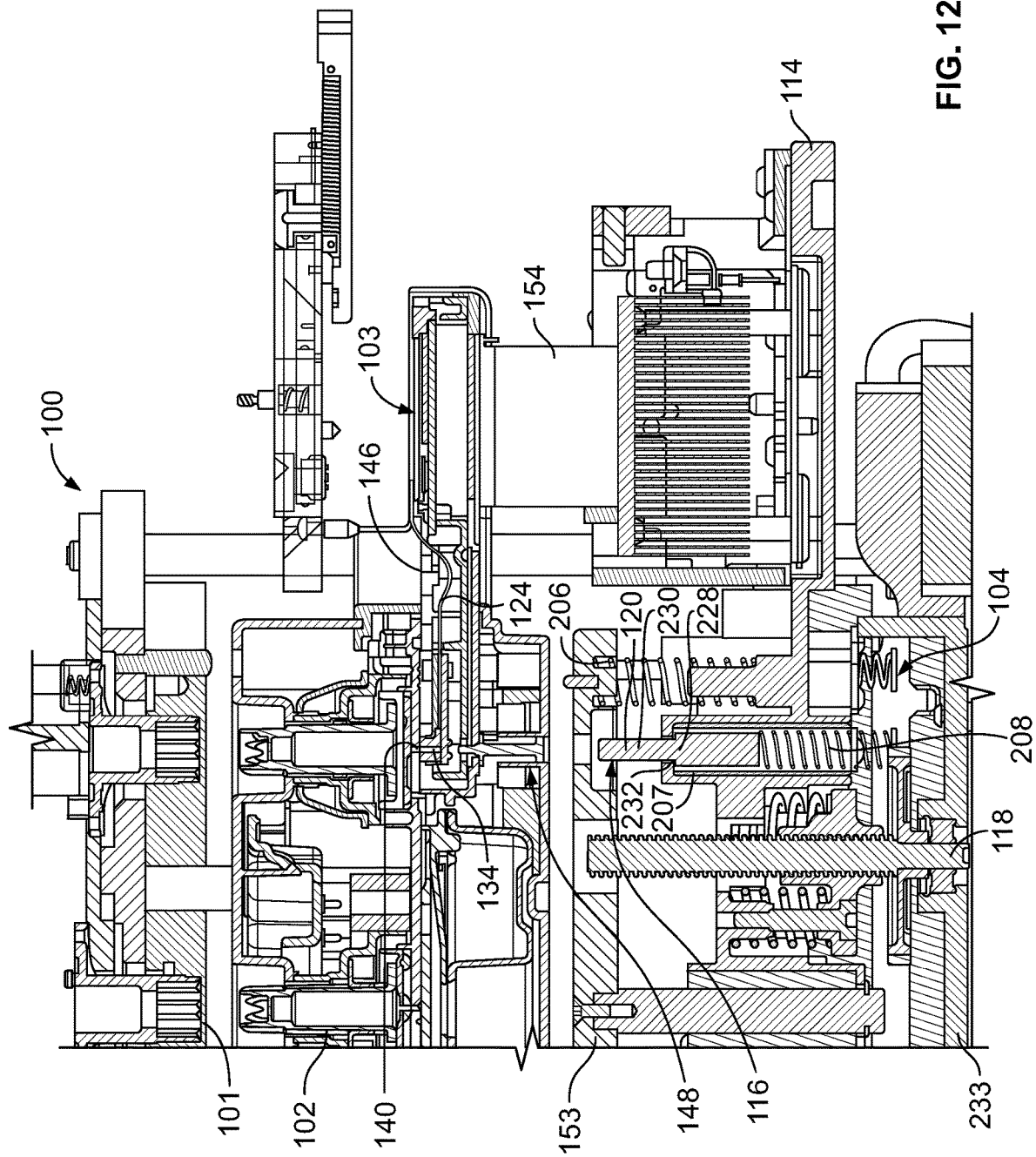
FIG. 12 is a cross-sectional view of the reagent cartridge, the flow cell assembly, and the lift plate assembly of FIG. 6 with the lift plate assembly in the lowered position and the reagent cartridge received within the reagent cartridge receptacle.

FIG. 12 is a cross-sectional view of the reagent cartridge 102, the flow cell assembly 103, and the lift plate assembly 104 of FIG. 6 with the lift plate assembly 104 in the lowered position and the reagent cartridge 102 received within the reagent cartridge receptacle 101. The flow cell assembly 103 is received within the flow cell receptacle 146 of the reagent cartridge 102. In the implementation shown, the system plunger 120 includes a larger width portion 228 and a smaller width portion 230. The larger width portion 228 may have a circular cross-section. The smaller width portion may have a circular cross-section. However, either of the larger width portion 228 and/or the smaller width portion 230 may have a different cross-section. A plunger step 232 is formed between the larger width portion 228 and the smaller width portion 230.

Figure 13:
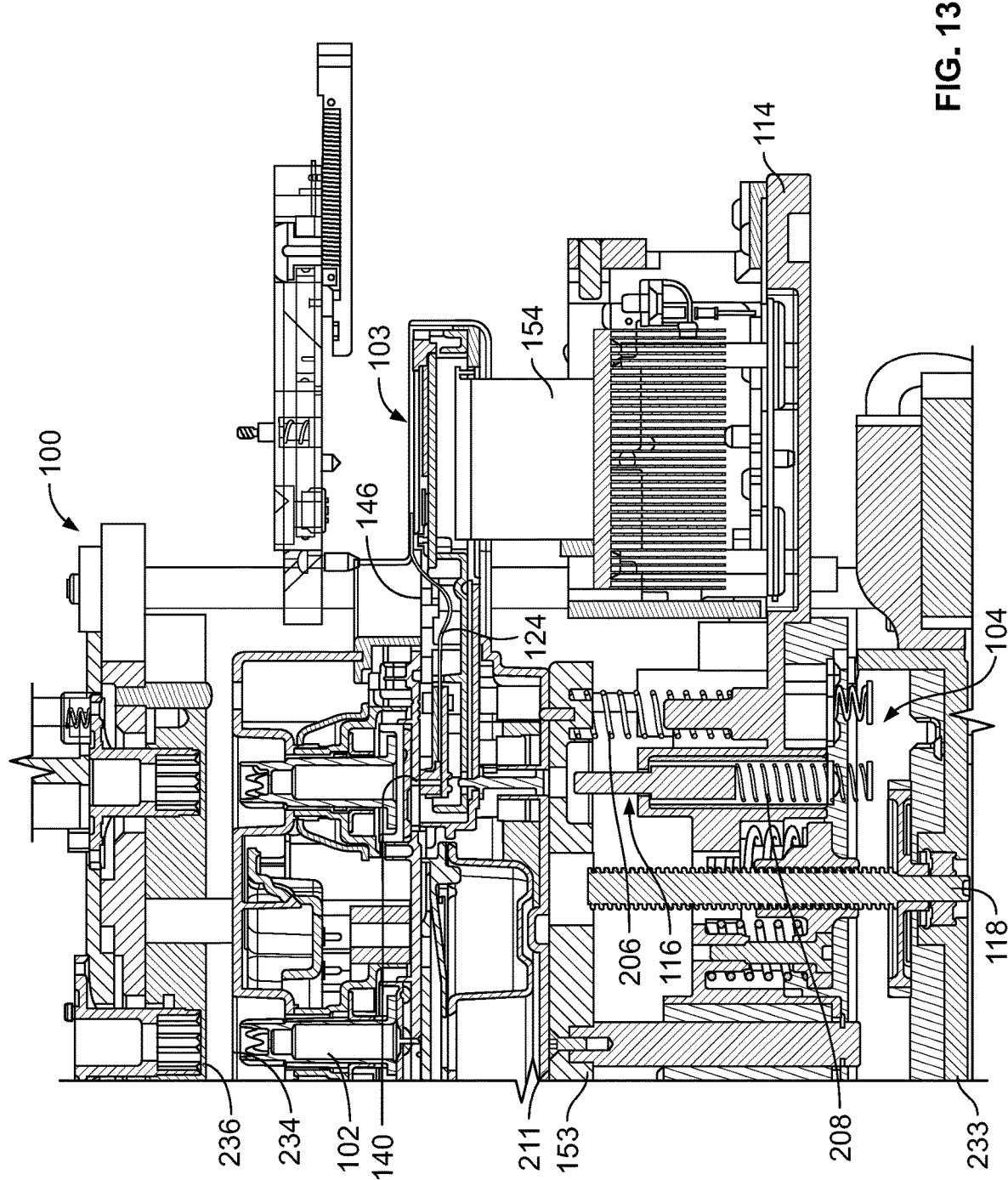
FIG. 13 is another cross-sectional view of the reagent cartridge, the flow cell assembly, and the lift plate assembly of FIG. 6 showing the bias plate in engagement with the bottom surface of the reagent cartridge after the lift plate drive assembly has moved the system plunger assembly and the bias plate toward the reagent cartridge.

FIG. 13 is another cross-sectional view of the reagent cartridge 102, the flow cell assembly 103, and the lift plate assembly 104 of FIG. 6 showing the bias plate 153 in engagement with the bottom surface 211 of the reagent cartridge 102 after the lift plate drive assembly 118 has moved the system plunger assembly 116 and the bias plate 153 toward the reagent cartridge 102. The lift plate 114 is lifted from a base 233 of the lift plate assembly 104 using a screw drive of the lift plate drive assembly 118. A top surface 234 of the reagent cartridge 102 is spaced from an internal reagent cartridge receptacle surface 236 of the system 100 initially when the bias plate 153 engages with the bottom surface 211 of the reagent cartridge 102.

Figure 14:
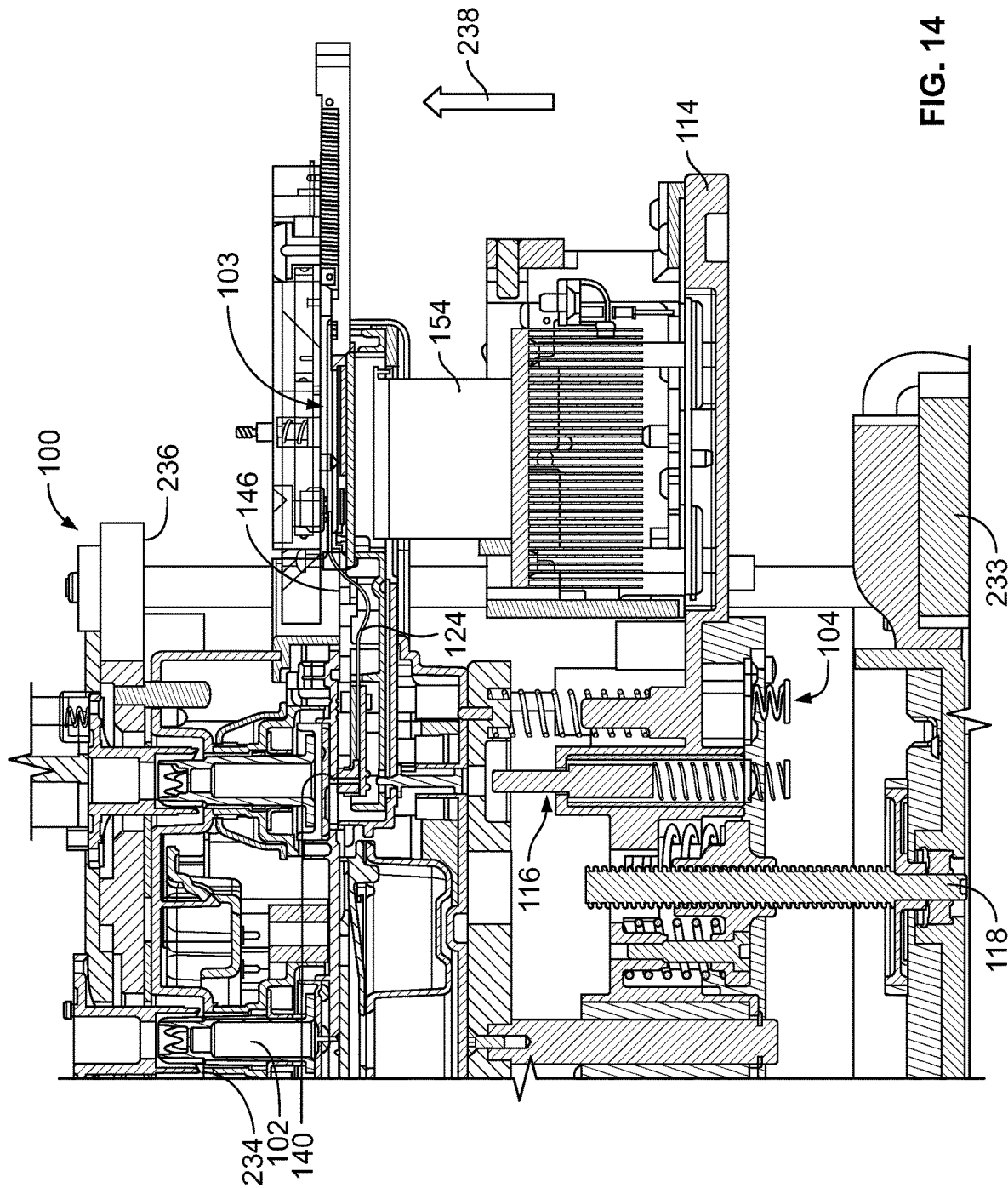
FIG. 14 is another cross-sectional view of the reagent cartridge, the flow cell assembly, and the lift plate assembly of FIG. 6 showing the top surface of the reagent cartridge engaging and/or adjacent the internal reagent cartridge receptacle surface of the system after the lift plate drive assembly has moved the system plunger assembly and the reagent cartridge further in a direction generally indicated by arrow.

FIG. 14 is another cross-sectional view of the reagent cartridge 102, the flow cell assembly 103, and the lift plate assembly 104 of FIG. 6 showing the top surface 234 of the reagent cartridge 102 engaging and/or adjacent the internal reagent cartridge receptacle surface 236 of the system 100 after the lift plate drive assembly 118 has moved the system plunger assembly 116 and the reagent cartridge 102 further in a direction generally indicated by arrow 238. That is, as the lift plate assembly 104 is driven vertically (see, arrow 238), the bias plate 153 and the internal reagent cartridge receptacle surface 236 cooperatively clamp the reagent cartridge 102 therebetween. In some implementations, components of the valve drive assembly 164 and/or pump drive assembly 162 can engage with corresponding valves 158 and/or pumps 166.

Figure 15:
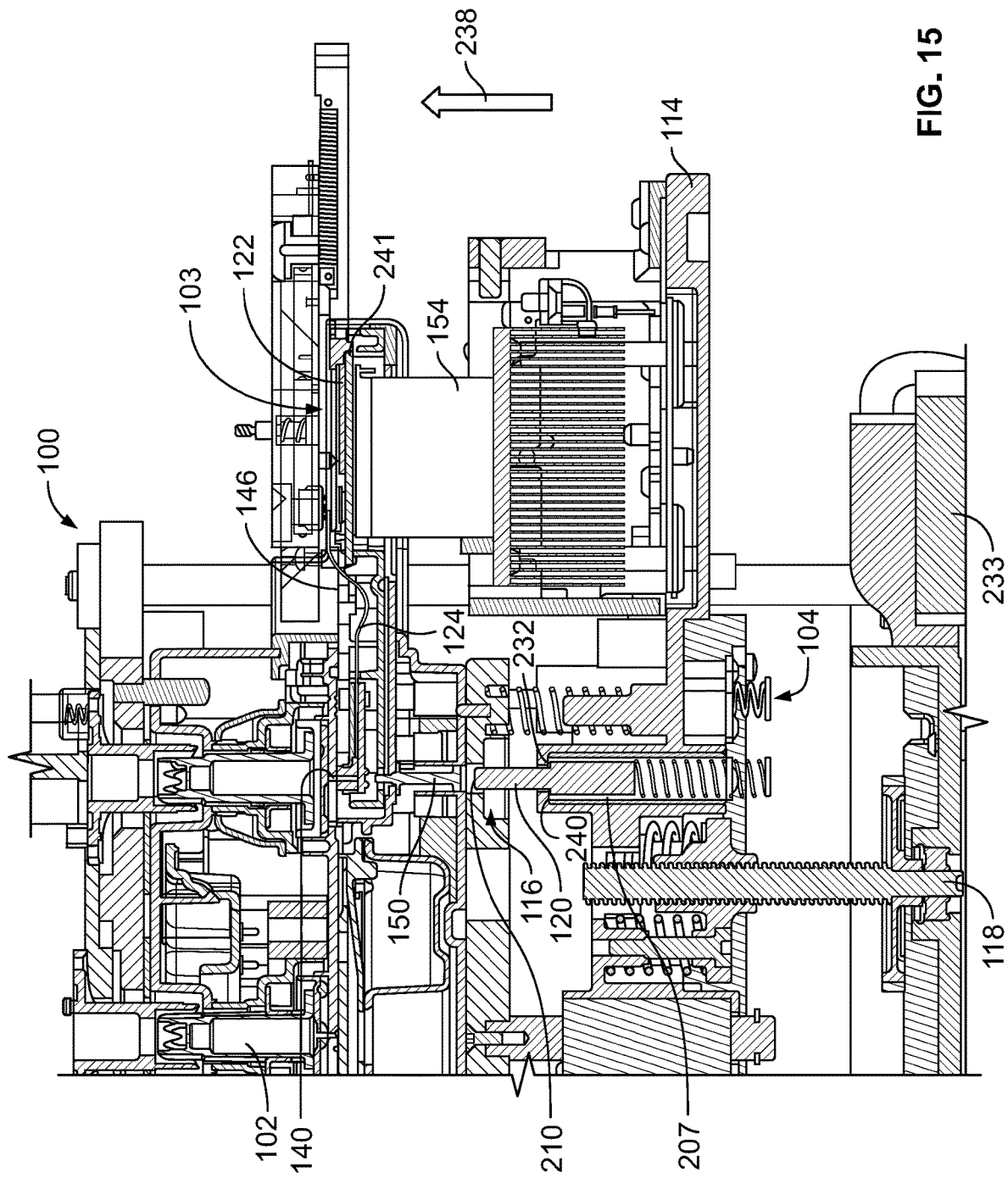
FIG. 15 is another cross-sectional view of the reagent cartridge, the flow cell assembly, and the lift plate assembly of FIG. 6 showing the heater positioned adjacent the flow cell and the plunger step of the system plunger engaging a stop provided within the plunger bore.

FIG. 15 is another cross-sectional view of the reagent cartridge 102, the flow cell assembly 103, and the lift plate assembly 104 of FIG. 6 showing the heater 154 positioned adjacent the flow cell 122 and the plunger step 232 of the system plunger 120 engaged with a stop 240 provided within the plunger bore 207 as a result of the spring within the plunger bore 207 urging the larger width portion 228 of the system plunger 120 against the plunger step 232. That is, as the lift plate assembly 104 is driven vertically (see, arrow 238), a surface of the heater 154 can contact a carrier plate 241 carrying a flow cell 122 to lift or float the flow cell 122 and the carrier plate 241 within the flow cell assembly 103. The distal end 210 of the system plunger 120 is spaced from the corresponding reagent cartridge plunger 150, but is aligned with the corresponding reagent cartridge bore 212. The heater 154 is shown engaging the carrier plate 241 of the flow cell assembly 103.

Figure 16:
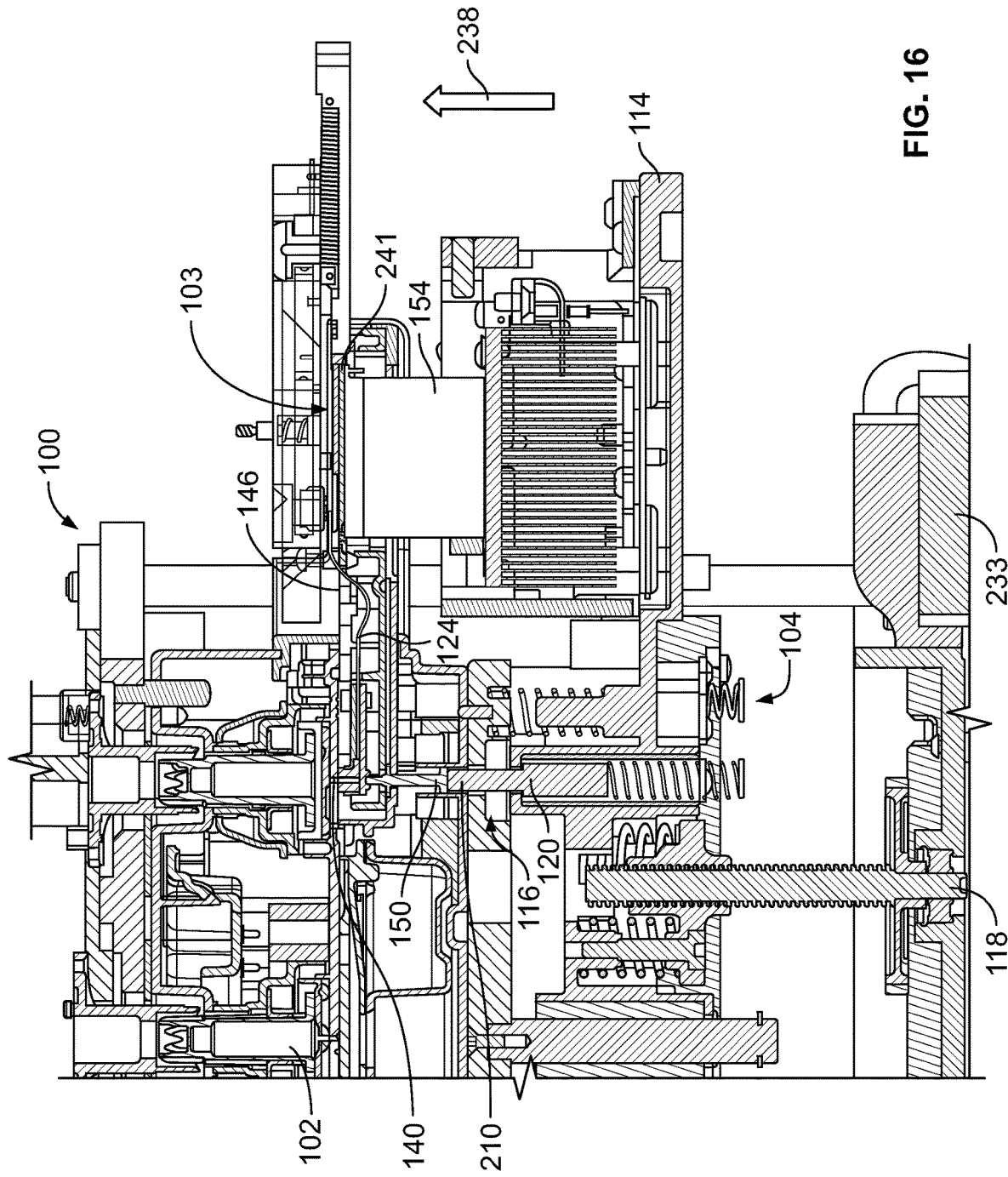
FIG. 16 is another cross-sectional view of the reagent cartridge, the flow cell assembly, and the lift plate assembly of FIG. 6 showing the distal end of the system plunger engaging the corresponding reagent cartridge plunger after the lift plate assembly further moves the lift plate in the direction generally indicated by the arrow.

FIG. 16 is another cross-sectional view of the reagent cartridge 102, the flow cell assembly 103, and the lift plate assembly 104 of FIG. 6 showing the distal end 210 of the system plunger 120 engaging the corresponding proximal end of a corresponding reagent cartridge plunger 150 after the lift plate assembly 104 further moves the lift plate 114 in the direction generally indicated by the arrow 238. That is, as the lift plate assembly 104 is driven vertically (see, arrow 238), the distal end 200 of the corresponding reagent cartridge plunger 150 aligns to a corresponding plunger receptacle 198 of the gasket assembly 126 to begin to fluidically couple the flow cell gaskets 134 with corresponding reagent cartridge ports 140.

Figure 17:
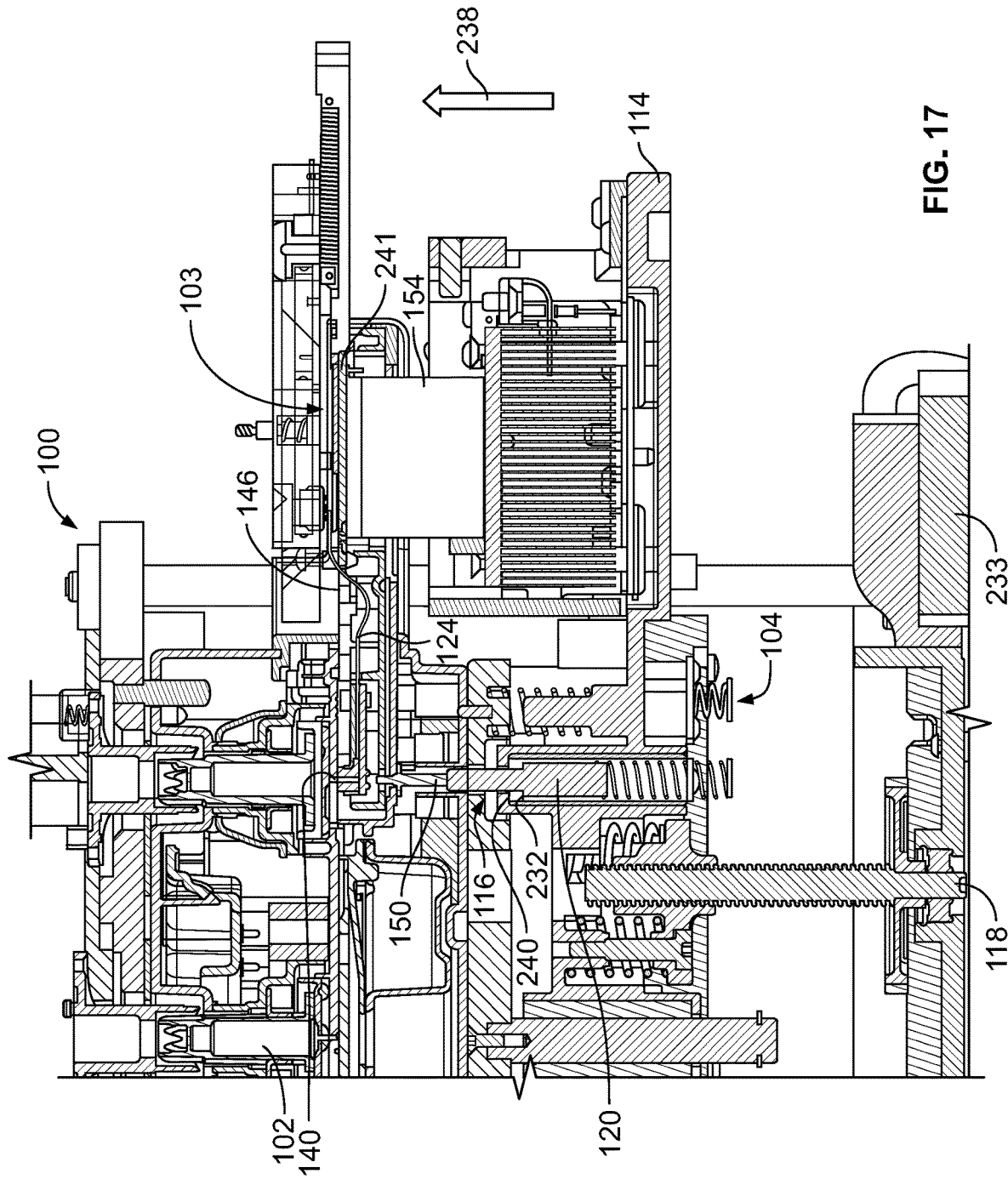
FIG. 17 is another cross-sectional view of the reagent cartridge, the flow cell assembly, and the lift plate assembly of FIG. 6 showing the reagent cartridge plunger urging the flow cell gasket into engagement with the corresponding reagent cartridge port.

FIG. 17 is another cross-sectional view of the reagent cartridge 102, the flow cell assembly 103, and the lift plate assembly 104 of FIG. 6 showing the reagent cartridge plunger 150 urging the flow cell gasket 134 into engagement with the corresponding reagent cartridge port 140. That is, as the lift plate assembly 104 is driven vertically (see, arrow 238), each reagent cartridge plunger 150 engages with a corresponding plunger receptacle 198 of the gasket assembly 126 and/or a surface of the gasket assembly 126. The alignment protrusions 190 initially engage and self-align with the alignment receptacles 191, which thereby align the through bores 138 of the flow cell gaskets 134 with reagent cartridge ports 140. As the lift plate assembly 104 continues to be driven vertically, the flow cell gaskets 134 compress against the reagent cartridge ports 140 to form a compressive seal. The compressive seal may be a hermetic seal. To avoid over compression of the flow cell gaskets 134, the springs within the plunger bores 207 can be selected to have a spring constant to allow the system plunger 120 to compress the spring within the plunger bore 207 as shown with the plunger step 232 of the system plunger 120 being spaced from the stop 240 provided within the plunger bore 207. In particular, the system plunger 120 has moved in a direction opposite the direction of movement of the lift plate 114 (see, arrow 238) and against a spring force of the spring 208 to prevent the system plunger 120 from compressing the flow cell gasket 134 above a threshold amount. The spring 208 may have a spring force sufficient to urge the flow cell gasket 134 into engagement with the corresponding reagent cartridge port 140 and to enable fluid communication between the reagent cartridge port 140 and the flow cell gasket 134. The spring force of the spring 208 may enable a hermetic seal to be established between the flow gasket 134 and the corresponding reagent cartridge port 140.

Figure 18:
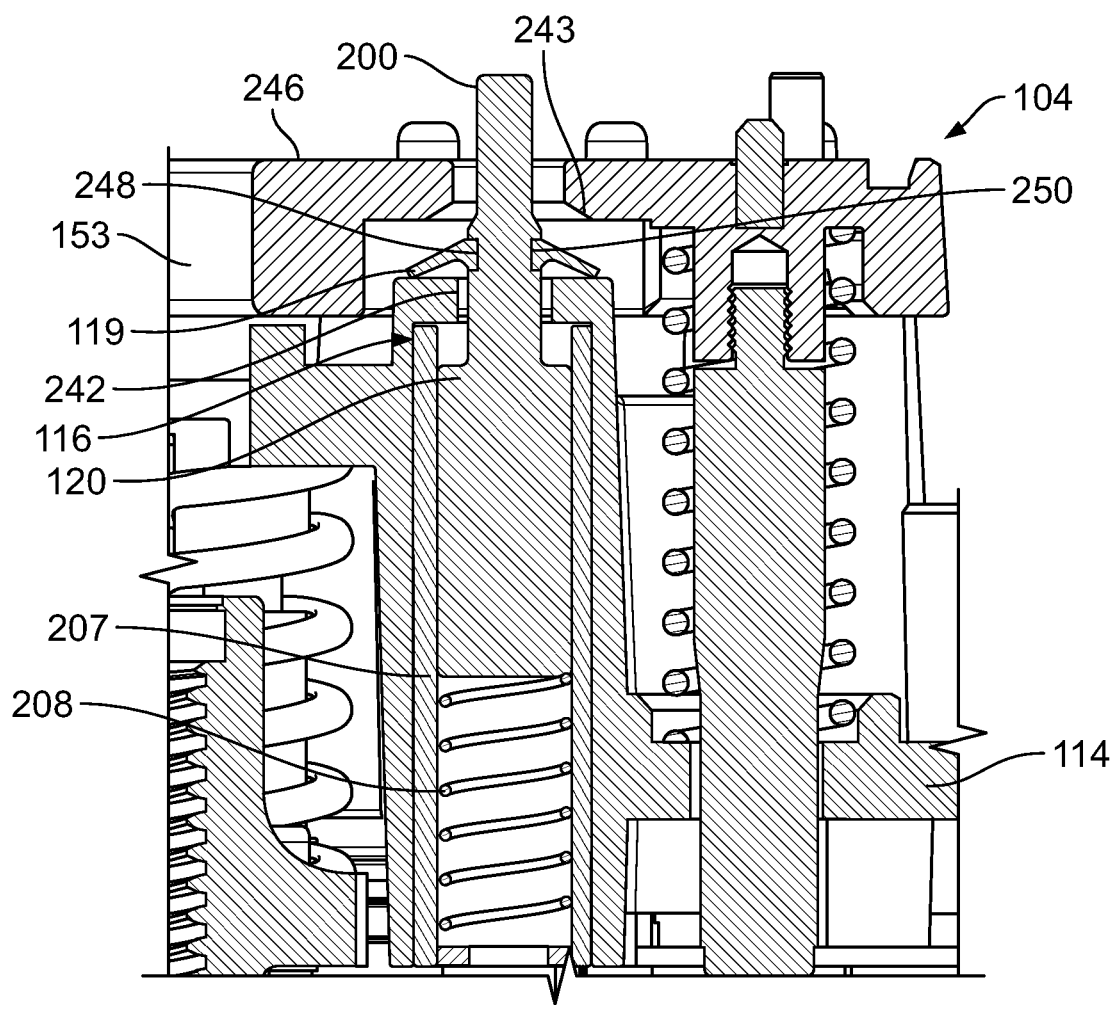
FIG. 18 is an enlarged isomeric cross-sectional view of another implementation of the lift plate assembly of FIG. 6 and one of the system plungers.

FIG. 18 is an enlarged isometric cross-sectional view of another implementation of the lift plate assembly 104 of FIG. 6 and one of the system plungers 120. In the implementation shown, the system plunger 120 is carrying a seal 119. The seal 119 may be referred to as a gasket. The seal 119 is adapted to sealingly engage the lift plate 114 at an entrance 242 of the plunger bore 207. The engagement between the seal 119 and the lift plate 114 may prevent fluid from entering the plunger bore 207.

The bias plate 153 includes a bias plate seat 243. The bias plate seat 243 faces the lift plate 114. The bias plate seat 243 may receive the seal 119 when the reagent cartridge plunger 150 is in the extended position (see, for example, FIG. 16).

The seal 119 may alternatively be in a different position along the system plunger 120. In these other configurations, the bias plate seat 243 may be disposed in a different position accordingly. For example, the seal 119 may be coupled adjacent the distal end 200 of the system plunger 120. In such an implementation, the seal 119 may be arranged to sealingly engage a bias plate surface 246 of the bias plate 153. The bias plate seat 243 may also be arranged to receive the seal 119 at the bias plate surface 246. Other arrangements may prove suitable. The system plunger 120 defines a plunger groove 248. The seal 119 includes a through hole 250 that allows the seal 119 to surround the system plunger 120. The seal 119 is received within the plunger groove 248.

Figure 19:
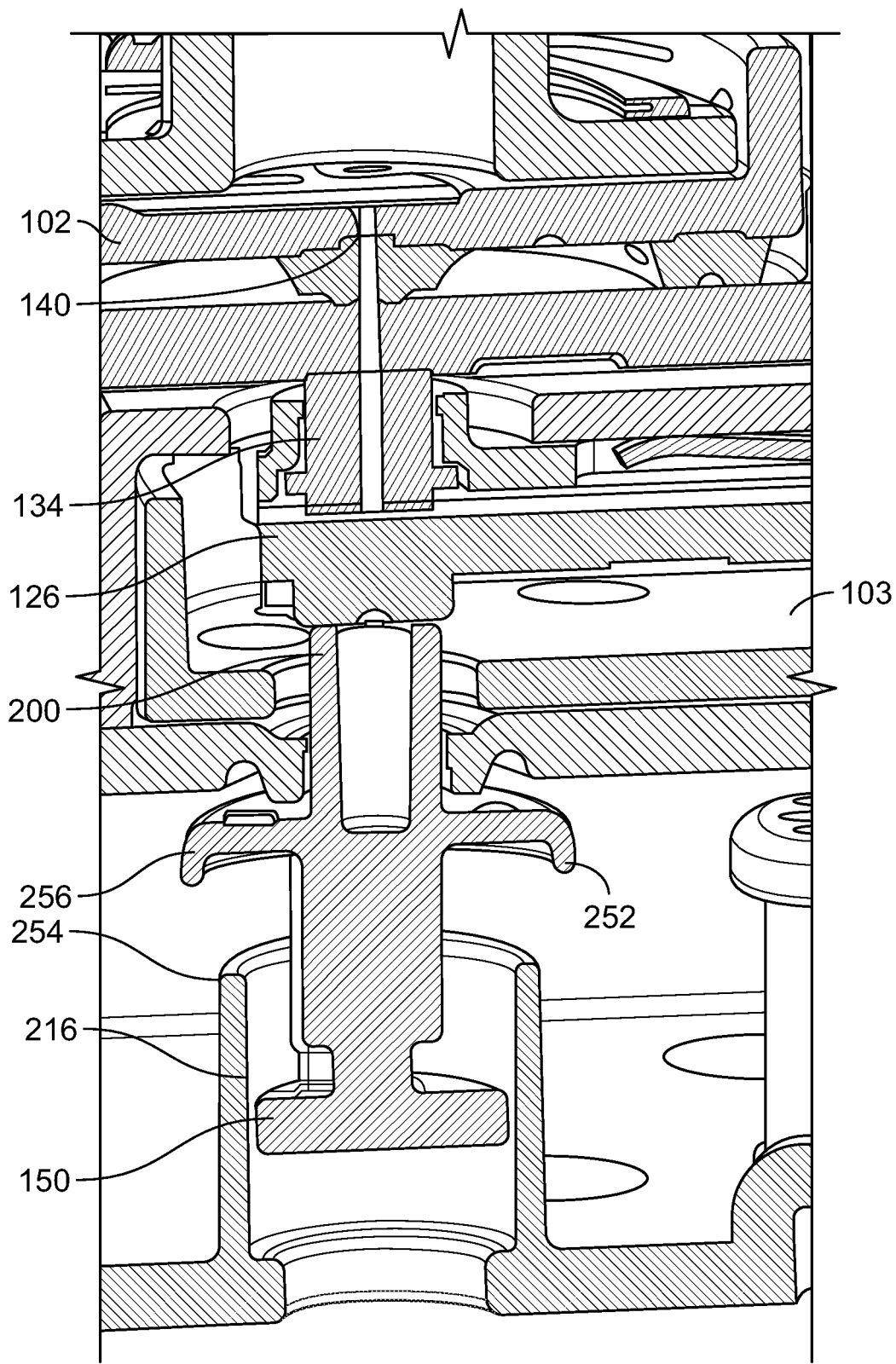
FIG. 19 is an enlarged isometric cross-sectional view of the reagent cartridge and the flow cell assembly of FIG. 6 showing the reagent cartridge plunger in an extended position and urging the flow cell gasket into engagement with the corresponding reagent cartridge port.

FIG. 19 is an enlarged isometric cross-sectional view of the reagent cartridge 102 and the flow cell assembly 103 of FIG. 6 showing the reagent cartridge plunger 150 in an extended position and urging the flow cell gasket 134 into engagement with the corresponding reagent cartridge port 140. The extended position may be referred to as an actuated position. The reagent cartridge plunger 150 includes a flange 252. The flange 252 is adapted to engage a stop 254 of the projections 218 that defines a portion of the plunger bore 216. The flange 252 includes a downward-facing lip 256 relative to the orientation shown in FIG. 19. The lip 256 may have an umbrella shape. The lip 256 may be arranged to surround the stop 254.

Figure 20:
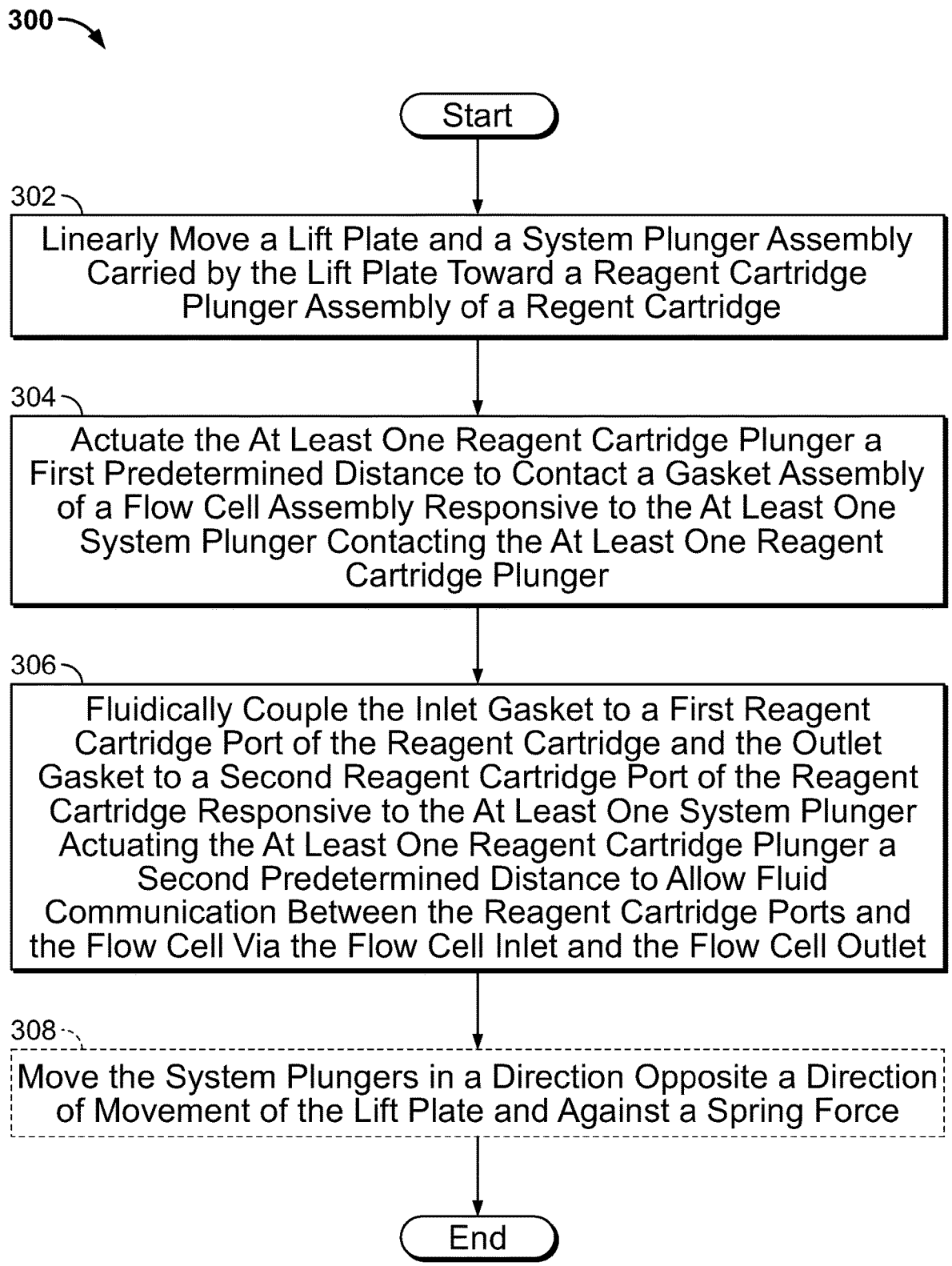
FIG. 20 illustrates a flowchart for performing a method of fluidically coupling the flow gasket assembly and the reagent cartridge of FIG. 1A or any of the other implementations disclosed herein.
Figure 21:
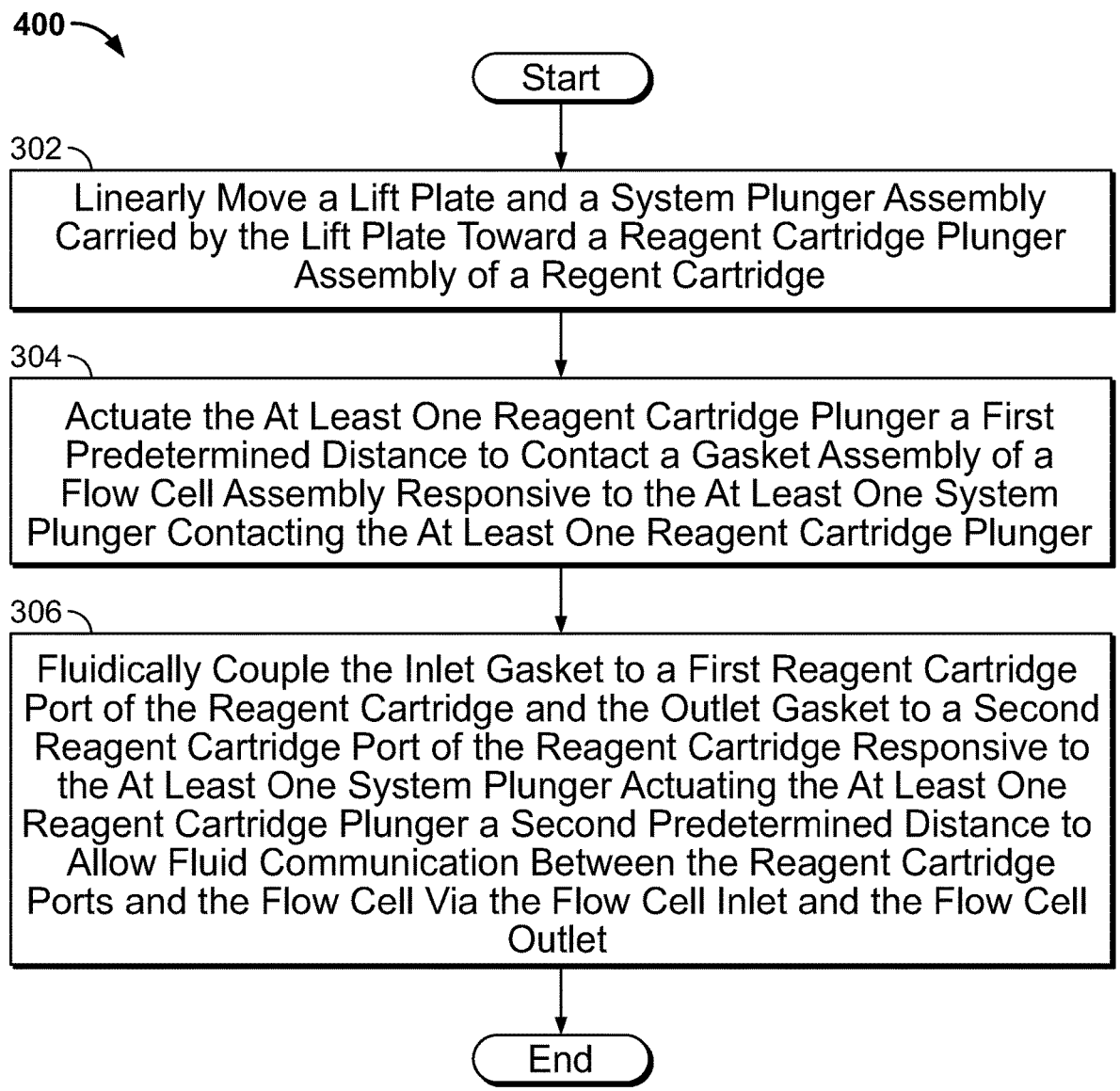
FIG. 21 illustrates another flowchart for performing a method of fluidically coupling the flow gasket assembly and the reagent cartridge of FIG. 1A or any of the other implementations disclosed herein.

FIGS. 20 and 21 illustrate flowcharts for performing a method of fluidically coupling the flow gasket assembly 126 and the reagent cartridge 102 of FIG. 1A or any of the other implementations disclosed herein. In the flow chart of FIG. 20, the blocks surrounded by solid lines may be included in an implementation of a process 900 while the blocks surrounded in dashed lines may be optional in the implementation of the process 900. However, regardless of the way the border of the blocks is presented in FIGS. 20 and 21, the order of execution of the blocks may be changed, and/or some of the blocks described may be changed, eliminated, combined and/or subdivided into multiple blocks.

A process 300 of FIG. 20 begins by linearly moving the lift plate 114 and the system plunger assembly 116 carried by the lift plate 114 toward the reagent cartridge plunger assembly 148 of the reagent cartridge 102. (block 302). The system plunger assembly 116 includes at least one system plunger 120 and the reagent plunger assembly 148 includes at least one reagent cartridge plunger 150. The at least one reagent cartridge plunger 150 is actuated a first predetermined distance to contact the gasket assembly 126 of the flow cell assembly 103 responsive to the at least one system plunger 120 contacting the at least one reagent cartridge plunger 150. (block 304).

The flow cell assembly 103 includes the flow cell 122 including at least one channel 128, the flow cell inlet 130, and the flow cell outlet 132. The first fluidic coupling 124 is coupled to the flow cell inlet 130 and the second fluidic coupling 125 is coupled to the flow cell outlet 132. In some implementations, the first fluidic coupling 124 and the second fluidic coupling 125 are combined. For example, the first and second fluidic couplings 124, 125 may be formed of a single substrate having fluidic lines for coupling the flow cell gaskets 134 and the flow cell 122. The substrate may be flexible. In some implementations, the first and second fluidic couplings 124, 125 may be omitted and the flow cell gaskets 134 and the flow cell 122 may be directly fluidically connected.

The gasket assembly 126 is coupled to the first and second fluidic couplings 124, 125. The gasket assembly 126 includes the inlet gasket 134 having the through bore 138 and is coupled to the flow cell inlet 130 via the first fluidic coupling 124. The gasket assembly 126 also includes the outlet gasket 134 having the through bore 138 and being coupled to the flow cell outlet 132 via the second fluidic coupling 125.

The inlet gasket 134 is fluidically coupled to the first reagent cartridge port 140 of the reagent cartridge 102 and the outlet gasket 134 is fluidically coupled to the second reagent cartridge port 140 of the reagent cartridge 102 responsive to the at least one system plunger 120 actuating the at least one reagent cartridge plunger 150 a second predetermined distance to allow fluid communication between the reagent cartridge ports 140 and the flow cell 103 via the flow cell inlet 130 and the flow cell outlet 132 (block 306). The system plungers 120 may move in a direction opposite a direction of movement of the lift plate 114 and against a spring force. (block 308). The spring force may be applied by the spring 206. The lift plate 114 may apply a first compressive force on the reagent cartridge body 156 while the spring force and system plungers 120 apply a second, different compressive force on the inlet gasket 134 and outlet gasket 134. Thus, the springs 206, 208 may have different spring forces or may otherwise apply different forces to the corresponding components such that the reagent cartridge 102 is securely clamped by the lift plate while the flow cell gaskets 134 are not over compressed against the reagent cartridge ports 140.

In some implementations, the first fluidic coupling 124 and the second fluidic coupling 124 of the flow cell assembly 103 are a flexible fluidic coupling such that the flow cell 103 is moveable at least one of vertically, longitudinally, or laterally, while the inlet gasket 134 is fluidically coupled to the first reagent cartridge port 140 of the reagent cartridge 102 and the outlet gasket 134 is fluidically coupled to the second reagent cartridge port 140 of the reagent cartridge 102.

A process 400 of FIG. 21 begins by linearly moving the lift plate 114 and the system plunger assembly 116 carried by the lift plate 114 toward the reagent cartridge plunger assembly 148 of the reagent cartridge 102. (block 402). The system plunger assembly 116 includes at least one system plunger 120 and the reagent plunger assembly 148 includes at least one reagent cartridge plunger 150. The at least one reagent cartridge plunger 150 is actuated a first predetermined distance to contact the gasket assembly 126 of the flow cell assembly 103 responsive to the at least one system plunger 120 contacting the at least one reagent cartridge plunger 150. (block 404).

The flow cell assembly 103 includes the flow cell 122 including at least one channel 128, the flow cell inlet 130, and the flow cell outlet 132. The first fluidic coupling 124 is coupled to the flow cell inlet 130 and the second fluidic coupling 125 is coupled to the flow cell outlet 132. The gasket assembly 126 is coupled to the first and second fluidic couplings 124, 125. The gasket assembly 126 includes the inlet gasket 134 having the through bore 138 and being coupled to the flow cell inlet 130 via the first fluidic coupling 124. The gasket assembly 126 also includes the outlet gasket 134 having the through bore 138 and being coupled to the flow cell outlet 132 via the second fluidic coupling 125. In some implementations, the first and second fluidic couplings 124, 125 may be omitted and the flow cell gaskets 134 and the flow cell 122 may be directly fluidically connected.

The inlet gasket 134 is fluidically coupled to the first reagent cartridge port 140 of the reagent cartridge 102 and the outlet gasket 134 is fluidically coupled to the second reagent cartridge port 140 of the reagent cartridge 102 responsive to the at least one system plunger 120 actuating the at least one reagent cartridge plunger 150 a second predetermined distance to allow fluid communication between the pair of reagent cartridge ports 140 and the flow cell 103 via the flow cell inlet 130 and the flow cell outlet 132 (block 406).

A method, comprising: linearly moving a lift plate and a system plunger assembly carried by the lift plate toward a reagent cartridge plunger assembly of a regent cartridge, the system plunger assembly including at least one system plunger, the reagent plunger assembly including at least one reagent cartridge plunger; actuating the at least one reagent cartridge plunger a first predetermined distance to contact a gasket assembly of a flow cell assembly responsive to the at least one system plunger contacting the at least one reagent cartridge plunger, the flow cell assembly including a flow cell including at least one channel, a flow cell inlet, and a flow cell outlet; a first fluidic coupling fluidically coupled to the flow cell inlet and a second fluidic coupling fluidically coupled to the flow cell outlet; and the gasket assembly fluidically coupled to the first and second fluidic fluidically couplings and having an inlet gasket having a through bore and being coupled to the flow cell inlet via the first fluidic coupling, and an outlet gasket having a through bore and being fluidically coupled to the flow cell outlet via the second fluidic coupling; and fluidically coupling the inlet gasket to a first reagent cartridge port of the reagent cartridge and fluidically coupling the outlet gasket to a second reagent cartridge port of the reagent cartridge responsive to the at least one system plunger actuating the at least one reagent cartridge plunger a second predetermined distance to allow fluid communication between the reagent cartridge ports and the flow cell via the flow cell inlet and the flow cell outlet.

The method of any one or more of the preceding implementations and/or any one or more of the implementations disclosed below, wherein the first fluidic coupling and the second fluidic coupling of the flow cell assembly are each a flexible fluidic coupling such that the flow cell is moveable at least one of vertically, longitudinally, or laterally relative to the gasket assembly, while the inlet gasket is fluidically coupled to the first reagent cartridge port of the reagent cartridge and the outlet gasket is fluidically coupled to the second reagent cartridge port of the reagent cartridge.

The method of any one or more of the preceding implementations and/or any one or more of the implementations disclosed below, further comprising moving the system plungers in a direction opposite a direction of movement of the lift plate and against a spring force.

The method of any one or more of the preceding implementations and/or any one or more of the implementations disclosed below, wherein the lift plate applies a first compressive force on a reagent cartridge body while the spring force and the system plungers apply a second, different compressive force on the inlet gasket and the outlet gasket.

The method of any one or more of the preceding implementations and/or any one or more of the implementations disclosed below, wherein the first fluidic coupling and the second fluidic coupling are combined.

An apparatus, comprising: a system, including: a reagent cartridge receptacle; a lift plate assembly including a lift plate, a system plunger assembly carried by the lift plate and including a plurality of system plungers, and a lift plate drive assembly operatively coupled to the lift plate; a flow cell assembly, including: a flow cell including at least one channel, a flow cell inlet, and a flow cell outlet; a fluidic coupling fluidically coupled to each of the flow cell inlet and the flow cell outlet; and a gasket assembly fluidically coupled to the fluidic coupling and having a flow cell inlet gasket and a flow cell outlet gasket, the flow cell inlet gasket having a through bore and being fluidically coupled to the flow cell inlet via the fluidic coupling, the flow cell outlet gasket having a through bore and being coupled to the flow cell outlet via the fluidic coupling; a reagent cartridge receivable within the reagent cartridge receptacle, the reagent cartridge, comprising: a reagent cartridge plunger assembly having a plurality of reagent cartridge plungers, wherein each reagent cartridge plunger is adapted to be aligned with a corresponding system plunger of the system plunger assembly and a corresponding flow cell gasket of the flow cell assembly when the reagent cartridge is received within the reagent cartridge receptacle; and a pair of reagent cartridge ports adapted to be fluidically coupled to the flow cell inlet gasket and the flow cell outlet gasket.

The apparatus of any one or more of the preceding implementations and/or any one or more of the implementations disclosed below, wherein the lift plate drive assembly is adapted to linearly move the lift plate and the system plungers and cause the system plungers to engage and move the reagent cartridge plungers into engagement with the gasket assembly to allow fluid communication between the pair of reagent cartridge ports and the flow cell via the flow cell inlet and the flow cell outlet.

The apparatus of any one or more of the preceding implementations and/or any one or more of the implementations disclosed below, wherein the system plungers comprise a pair of system plungers and the reagent cartridge plungers comprise a pair of reagent cartridge plungers.

The apparatus of any one or more of the preceding implementations and/or any one or more of the implementations disclosed below, wherein the flow cell assembly further comprises a leveler gasket.

The apparatus of any one or more of the preceding implementations and/or any one or more of the implementations disclosed below, wherein the system plungers comprise a leveler system plunger, the reagent cartridge plungers further comprise a leveler reagent cartridge plunger, and the reagent cartridge comprises a reagent cartridge engagement surface.

The apparatus of any one or more of the preceding implementations and/or any one or more of the implementations disclosed below, wherein the lift plate drive assembly is adapted to linearly move the lift plate and the leveler system plunger to engage and move the leveler reagent plunger into engagement with the gasket assembly to allow engagement between the leveler gasket and the reagent cartridge engagement surface.

The apparatus of any one or more of the preceding implementations and/or any one or more of the implementations disclosed below, wherein the leveler gasket, the flow cell inlet gasket, and the flow cell outlet gasket are arranged in a triangular pattern.

The apparatus of any one or more of the preceding implementations and/or any one or more of the implementations disclosed below, wherein the flow cell assembly has a flow cell housing that carries the flow cell, the fluidic coupling, and the gasket assembly.

The apparatus of any one or more of the preceding implementations and/or any one or more of the implementations disclosed below, wherein the flow cell housing has a dimensional envelope and the gasket assembly is disposed within the dimensional envelope of the flow cell housing.

The apparatus of any one or more of the preceding implementations and/or any one or more of the implementations disclosed below, wherein the flow cell housing includes an opening that corresponds to each flow cell gasket.

The apparatus of any one or more of the preceding implementations and/or any one or more of the implementations disclosed below, wherein the openings are arranged to allow the flow cell gaskets to protrude from the dimensional envelope of the flow cell housing after the reagent cartridge plungers move the gasket assembly a predetermined distance.

The apparatus of any one or more of the preceding implementations and/or any one or more of the implementations disclosed below, wherein the flow cell gaskets have flat surfaces and the reagent cartridge comprises a reagent cartridge engagement surface that faces a flow cell receptacle of the reagent cartridge.

The apparatus of any one or more of the preceding implementations and/or any one or more of the implementations disclosed below, wherein the flat surfaces of the flow cell gaskets are arranged to engage the reagent cartridge engagement surface to fluidically couple the pair of reagent cartridge ports with the flow cell.

The apparatus of any one or more of the preceding implementations and/or any one or more of the implementations disclosed below, wherein the reagent cartridge comprises alignment receptacles that face a flow cell receptacle of the flow cell receptacle and the gasket assembly has alignment protrusions that are adapted to be received by the alignment receptacles.

The apparatus of any one or more of the preceding implementations and/or any one or more of the implementations disclosed below, wherein the gasket assembly has a plurality of engagement protrusions that comprise corresponding plunger receptacles, each plunger receptacle being adapted to be engaged or surrounded by a distal end of a corresponding reagent cartridge plunger.

The apparatus of any one or more of the preceding implementations and/or any one or more of the implementations disclosed below, wherein the lift plate comprises plunger bores and wherein each system plunger is slidably disposed within a corresponding plunger bore.

The apparatus of any one or more of the preceding implementations and/or any one or more of the implementations disclosed below, further comprising a spring disposed in each of the plunger bores.

The apparatus of any one or more of the preceding implementations and/or any one or more of the implementations disclosed below, wherein the springs act on the system plungers to urge a distal end of the system plungers into engagement with a corresponding reagent cartridge plunger.

The apparatus of any one or more of the preceding implementations and/or any one or more of the implementations disclosed below, further comprising a seal carried by the system plunger.

The apparatus of any one or more of the preceding implementations and/or any one or more of the implementations disclosed below, wherein the reagent cartridge comprises a flow cell receptacle adapted to receive the flow cell assembly.

An apparatus, comprising: a flow cell assembly, including: a flow cell including at least one channel, a flow cell inlet, and a flow cell outlet; and a gasket assembly operatively fluidically coupled to the flow cell and having a flow cell inlet gasket and a flow cell outlet gasket, the flow cell inlet gasket having a through bore and being coupled to the flow cell inlet, the flow cell outlet gasket having a through bore and being fluidically coupled to the flow cell outlet; a reagent cartridge adapted to receive the flow cell assembly and comprising a pair of reagent cartridge ports adapted to be fluidly coupled to the flow cell inlet gasket and the flow cell outlet gasket.

The apparatus of any one or more of the preceding implementations and/or any one or more of the implementations disclosed below, further comprising a flexible fluidic coupling fluidically coupling the flow cell inlet and the flow cell inlet gasket and fluidically coupling the flow cell outlet and the flow cell outlet gasket.

The apparatus of any one or more of the preceding implementations and/or any one or more of the implementations disclosed below, further comprising a reagent cartridge plunger assembly having a plurality of reagent cartridge plungers, wherein each reagent cartridge plunger is positioned to correspond to a corresponding flow cell gasket of the flow cell assembly.

The apparatus of any one or more of the preceding implementations and/or any one or more of the implementations disclosed below, wherein the flow cell assembly further comprises a leveler gasket and the reagent cartridge comprises a reagent cartridge engagement surface adapted to be engaged by the leveler gasket.

The apparatus of any one or more of the preceding implementations and/or any one or more of the implementations disclosed below, wherein the flow cell inlet gasket, the flow cell outlet gasket, and the leveler gasket are arranged in a triangular pattern.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," "including," "having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. An apparatus, comprising:
   a system, including:
     a reagent cartridge receptacle;
     a lift plate assembly including a lift plate, a system plunger assembly carried by the lift plate and including a plurality of system plungers, and a lift plate drive assembly operatively coupled to the lift plate;
     a flow cell assembly, including:
       a flow cell housing having a dimensional envelope;
       a flow cell carried by the flow cell housing and including at least one channel, a flow cell inlet, and a flow cell outlet;
       a fluidic conduit fluidically coupled to each of the flow cell inlet and the flow cell outlet; and
       a gasket assembly disposed within the dimensional envelope of the flow cell housing, the gasket assembly fluidically coupled to the fluidic conduit and having a flow cell inlet gasket and a flow cell outlet gasket, the flow cell inlet gasket having a through bore and being fluidically coupled to the flow cell inlet via the fluidic conduit, the flow cell outlet gasket having a through bore and being fluidically coupled to the flow cell outlet via the fluidic conduit; and
   a reagent cartridge receivable within the reagent cartridge receptacle, the reagent cartridge comprising:
     a reagent cartridge plunger assembly having a plurality of reagent cartridge plungers, wherein each reagent cartridge plunger is adapted to be aligned with a corresponding system plunger of the system plunger assembly and a corresponding flow cell gasket of the flow cell assembly when the reagent cartridge is received within the reagent cartridge receptacle; and
     a pair of reagent cartridge ports adapted to be fluidically coupled to the flow cell inlet gasket and the flow cell outlet gasket,
   wherein the lift plate drive assembly is configured to drive movement of the lift plate linearly toward the reagent cartridge so as to cause the system plungers to engage the reagent cartridge plungers, thereby moving the reagent cartridge plungers into engagement with the gasket assembly to allow fluid communication between the pair of reagent cartridge ports and the flow cell via the flow cell inlet and the flow cell outlet.

2. The apparatus of claim 1, wherein the system plungers comprise a pair of system plungers and the reagent cartridge plungers comprise a pair of reagent cartridge plungers.

3. The apparatus of claim 2, wherein the flow cell assembly further comprises a leveler gasket.

4. The apparatus of claim 3, wherein the system plungers comprise a leveler system plunger, the reagent cartridge plungers further comprise a leveler reagent cartridge plunger, and the reagent cartridge comprises a reagent cartridge engagement surface.

5. The apparatus of claim 4, wherein the lift plate drive assembly is adapted to linearly move the lift plate and the leveler system plunger to engage and move the leveler reagent plunger into engagement with the gasket assembly to allow engagement between the leveler gasket and the reagent cartridge engagement surface.

6. The apparatus of claim 4, wherein the leveler gasket, the flow cell inlet gasket, and the flow cell outlet gasket are arranged in a triangular pattern.

7. The apparatus of claim 1, wherein the flow cell housing carries the flow cell, the fluidic conduit, and the gasket assembly, and wherein the flow cell housing is partially disposed within the reagent cartridge and partially disposed outside of the reagent cartridge.

8. The apparatus of claim 1, wherein the flow cell housing includes a top housing surface and an opening that is formed in the top housing surface and corresponds to each flow cell gasket.

9. The apparatus of claim 8, wherein the openings are arranged to allow the flow cell gaskets to protrude from the dimensional envelope of the flow cell housing after the reagent cartridge plungers move the gasket assembly a predetermined distance.

10. The apparatus of claim 1, wherein the flow cell gaskets have flat surfaces and the reagent cartridge comprises a reagent cartridge engagement surface that faces a flow cell receptacle of the reagent cartridge.

11. The apparatus of claim 10, wherein the flat surfaces of the flow cell gaskets are arranged to engage the reagent cartridge engagement surface to fluidically couple the pair of reagent cartridge ports with the flow cell.

12. The apparatus of claim 1, wherein the reagent cartridge comprises alignment receptacles that face a flow cell receptacle of the reagent cartridge and the gasket assembly has alignment protrusions that are adapted to be received by the alignment receptacles.

13. The apparatus of claim 1, wherein the gasket assembly has a plurality of engagement protrusions that comprise corresponding plunger receptacles, each plunger receptacle being adapted to be engaged or surrounded by a distal end of a corresponding reagent cartridge plunger.

14. The apparatus of claim 1, wherein the lift plate comprises plunger bores and wherein each system plunger is slidably disposed within a corresponding plunger bore.

15. The apparatus of claim 14, further comprising a spring disposed in each of the plunger bores.

16. The apparatus of claim 15, wherein the springs act on the system plungers to urge a distal end of the system plungers into engagement with a corresponding reagent cartridge plunger.

17. The apparatus of claim 14, further comprising a seal carried by the system plunger.

18. The apparatus of claim 12, wherein the reagent cartridge comprises a flow cell receptacle adapted to receive the flow cell assembly.

19. A method of using the apparatus of claim 1, comprising:
linearly moving the lift plate and the system plunger assembly toward the reagent cartridge plunger assembly of the regent cartridge;
actuating each of the plurality of reagent cartridge plungers a first predetermined distance to contact the gasket assembly responsive to the plurality of system plungers contacting the plurality of reagent cartridge plungers, wherein the fluidic conduit includes a first fluidic coupling fluidically coupled to the flow cell inlet and a second fluidic coupling fluidically coupled to the flow cell outlet, and wherein the flow cell inlet gasket is fluidically coupled to the flow cell inlet via the first fluidic coupling and the flow cell outlet gasket is fluidically coupled to the flow cell outlet via the second fluidic coupling; and
fluidically coupling the inlet gasket to a first reagent cartridge port of the pair of reagent cartridge ports of the reagent cartridge and fluidically coupling the outlet gasket to a second reagent cartridge port of the pair of reagent cartridge ports of the reagent cartridge responsive to the plurality of system plungers actuating the plurality of reagent cartridge plungers a second predetermined distance to allow fluid communication between the first and second reagent cartridge ports and the flow cell via the flow cell inlet and the flow cell outlet.

20. The method of claim 19, wherein the first fluidic coupling and the second fluidic coupling of the flow cell assembly are each a flexible fluidic coupling such that the flow cell is moveable at least one of vertically, longitudinally, or laterally relative to the gasket assembly while the flow cell inlet gasket is fluidically coupled to the first reagent cartridge port of the reagent cartridge and the flow cell outlet gasket is fluidically coupled to the second reagent cartridge port of the reagent cartridge.

21. The method of claim 19, further comprising moving the system plungers in a direction opposite a direction of movement of the lift plate and against a spring force.

22. The method of claim 21, wherein the lift plate applies a first compressive force on a reagent cartridge body while the spring force and the system plungers apply a second, different compressive force on the inlet gasket and the outlet gasket.

23. An apparatus, comprising:
a flow cell assembly, including:
a flow cell including at least one channel, a flow cell inlet, and a flow cell outlet; and
a gasket assembly operatively fluidically coupled to the flow cell and having a flow cell inlet gasket and a flow cell outlet gasket, the flow cell inlet gasket having a through bore and being fluidically coupled to the flow cell inlet, the flow cell outlet gasket having a through bore and being fluidically coupled to the flow cell outlet;
a reagent cartridge adapted to receive the flow cell assembly and comprising a pair of reagent cartridge ports adapted to be fluidly coupled to the flow cell inlet gasket and the flow cell outlet gasket;
a first fluidic laminate conduit that fluidically couples the flow cell inlet and the flow cell inlet gasket, wherein the first fluidic laminate conduit extends from the flow cell inlet to the flow cell inlet gasket; and
a second fluidic laminate conduit that fluidically couples the flow cell outlet and the flow cell outlet gasket, wherein the second fluidic laminate conduit extends from the flow cell outlet to the flow cell outlet gasket,
wherein the reagent cartridge includes alignment receptacles that face a flow cell receptacle of the reagent cartridge, wherein the gasket assembly includes alignment protrusions configured to be disposed in the alignment receptacles, respectively, and wherein when the alignment protrusions are disposed in the alignment receptacles, respectively, the through bores of the flow cell inlet and outlet gaskets are aligned with the pair of reagent cartridge ports, respectively.

24. The apparatus of claim 23, wherein each of the first and second fluidic laminate conduits is a flexible fluidic laminate conduit.

25. The apparatus of claim 23, further comprising a reagent cartridge plunger assembly having a plurality of reagent cartridge plungers, wherein each reagent cartridge plunger is positioned to correspond to a corresponding flow cell gasket of the flow cell assembly.

26. The apparatus of claim 23, wherein the flow cell assembly further comprises a leveler gasket and the reagent cartridge comprises a reagent cartridge engagement surface adapted to be engaged by the leveler gasket.

27. The apparatus of claim 26, wherein the flow cell inlet gasket, the flow cell outlet gasket, and the leveler gasket are arranged in a triangular pattern.

28. The apparatus of claim 1, wherein the fluidic conduit comprises: a first fluidic laminate conduit having a first end fluidically connected to the flow cell inlet and a second end fluidically connected to the flow cell inlet gasket, and a second fluidic laminate conduit having a first end fluidically connected to the flow cell outlet and a second end fluidically connected to the flow cell outlet gasket.

29. The apparatus of claim 23, wherein the flow cell assembly further comprises a flow cell housing having a dimensional envelope, wherein the flow cell is carried by the flow cell housing, and wherein the gasket assembly is disposed within the dimensional envelope of the flow cell housing.

30. The apparatus of claim 29, wherein the flow cell housing is partially disposed within the reagent cartridge and partially disposed outside of the reagent cartridge.

* * * * *